United States Patent
Ishii et al.

(10) Patent No.: US 8,671,386 B2
(45) Date of Patent: Mar. 11, 2014

(54) PROGRAM GENERATING APPARATUS AND BLOCK DIAGRAM GENERATING APPARATUS

(75) Inventors: Ena Ishii, Yokohama (JP); Mitsunobu Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1413 days.

(21) Appl. No.: 12/361,704

(22) Filed: Jan. 29, 2009

(65) Prior Publication Data

US 2009/0199157 A1   Aug. 6, 2009

(30) Foreign Application Priority Data

Jan. 31, 2008   (JP) .................................. 2008-21342

(51) Int. Cl.
   *G06F 9/44*   (2006.01)

(52) U.S. Cl.
   USPC ........... 717/105; 717/106; 717/108; 717/109; 716/139

(58) Field of Classification Search
   USPC ......................................... 717/105
   See application file for complete search history.

(56) References Cited

U.S. PATENT DOCUMENTS

| | | | |
|---|---|---|---|
| 5,313,615 A * | 5/1994 | Newman et al. | 716/139 |
| 6,425,121 B1 * | 7/2002 | Phillips | 717/105 |
| 7,979,843 B2 * | 7/2011 | Kodosky et al. | 717/109 |
| 2002/0178434 A1 * | 11/2002 | Fox et al. | 717/106 |

FOREIGN PATENT DOCUMENTS

| | | |
|---|---|---|
| JP | 11-095990 | 4/1999 |
| JP | 2000-020291 | 1/2000 |
| JP | 2005-222221 | 8/2005 |

OTHER PUBLICATIONS http://www.cybernet.co.jp/matlab/products/product_listing/rtwembedded/.
http://www.dspace.jp/ww/ja/jap/home/products/sw/pcgs/targetli.cfm.
Gallenkamp, Implementation of a Real-Time Simulator for Modelling the Dynamics of Closely Coupled Drive Systems, ISIE 03 IEEE International Synposium on Industrial Electronics, pp. 341-346.

* cited by examiner

Primary Examiner — Wei Zhen
Assistant Examiner — Mohammed Huda
(74) Attorney, Agent, or Firm — Turocy & Watson, LLP

(57) ABSTRACT

The apparatus of the present invention includes a block diagram dividing unit that divides a block diagram into a plurality of pieces at a branch point, connects a branch point block element to one end of a data line which has been connected to the branch point at each divided piece and thereby generates a plurality of block diagram pieces, a program instruction generator that generates program instructions for performing processing on each block diagram piece, an execution sequence determining unit that determines an execution sequence of generated program instructions, a structural information generator that generates structural information of each of the block diagram pieces and a program generator that arranges the program instructions according to the execution sequence, writes structural information of each block diagram piece into a comment line of each of the program instructions corresponding to each of the block diagram pieces and thereby generates a program.

6 Claims, 25 Drawing Sheets

```
<Block>
 <Type>Inport</Type>
 <Name>in1</Name>
</Block>
<Block>
 <Type>A</Type>
 <Name>a</Name>
</Block>
<Block>
 <Type>B</Type>
 <Name>b</Name>
</Block>
<Block>
 <Type>C</Type>
 <Name>c</Name>
</Block>
<Block>
 <Type>Outport</Type>
 <Name>out1</Name>
</Black>
<Black>
 <Type>Outport</Type>
 <Name>out2</Name>
</Block>
<Line>
 <SrcBlk>in1</SrcBlk>
 <DstBlk>a</DstBlk>
</Line>
<Line>
 <SrcBlk>a</SrcBlk>
<Branch>
  <DstBlk>b</DstBlk>
 </Branch>
 <Branch>
  <DstBlk>c</DstBlk>
 </Branch>
</Line>
<Line>
 <SrcBlk>b</SrcBlk>
 <DstBlk>out1</Dstblk>
</Line>
<Line>
 <SrcBlk>c<SrcBlk>
 <DstBlk>out2</DstBlk>
</Line>
```

FIG. 4

```
<BlockDiagram>
<Block Type="point" Name="a_out" >  ~2221
<Block Type="A" Name="a" >  ~2204
<Block Type="Inport" Name="in1" />  ~2201
</Block>
</Block>
<Block Type="Outport" Name="out1" >  ~2202
<Block Type="B" Name="b" >  ~2205
<Block Type="point" Name="a_out" />  ~2222
</Block>
</Block>
<Block Type="Outport" Name="out2" >  ~2203
<Block Type="C" Name="c" >  ~2206
<Block Type="point" Name="a_out" />  ~2223
</Block>
</Block>
</BlockDiagram>
```

FIG. 11

```
#sample program
<Block Type="point" Name="a_out" >
<Block Type="A" Name="a" >
<Block Type="inport" Name="in1" />
</Block>
</Block>
a_out=A(in1);

<Block Type="Outport" Name="out1" >
<Block Type="B" Name="b" >
<Block Type="point" Name="a_out" />
</Block>
</Block>
out1=B(a_out);

<Block Type="Outport" Name="out2" >
<Block Type="C" Name="c" >
<Block Type="point" Name="a_out" />
</Block>
</Block>
out2=C(a_out);
```

FIG. 12

303 res=integrator1_out; ~3011
out1=res; ~3012
integrator1_in=in_res; ~3013 integrator1_out
    =integrator1_out+integrator1_in*st ~3014

304 out1=res; ~3021
res=res+(in-res)*st; ~3022 out1=5*in1;  —306

PROGRAM GENERATING APPARATUS AND BLOCK DIAGRAM GENERATING APPARATUS

CROSS REFERENCE TO RELATED APPLICATIONS

This application is based upon and claims the benefit of priority from the prior Japanese Patent Applications No. 2008-21342, filed on Jan. 31, 2008; the entire contents of which are incorporated herein by reference.

BACKGROUND OF THE INVENTION

1. Field of the Invention

The present invention relates to a program generating apparatus and block diagram generating apparatus that can be used for, for example, a model base development tool.

2. Related Art

There is a technique called "model base design/development" in software development. The "model base design/development" refers to a method of designing software using a model and developing the software based on the model.

Above all, "model base design of control system software" refers to a method of performing control system design and simulation using a block diagram and developing software. There are known several tools which create source code of software from a block diagram to support model base design/development of control software (e.g., see http://www.cyber-net.co.jp/matlab/products/product_listing/rt wembedded/ or http://www.dspace.jp/ww/ja/jap/home/products/sw/pcgs/targ etli.cfm).

There are known several techniques related to generation of source code from a block diagram. JP-A 2000-20291 (Kokai) describes a grouping function that groups processing corresponding to a plurality of blocks into one source code. In association with a technique of generating code for only necessary parts in one block diagram by distinguishing blocks for which code is generated from blocks used only for a simulation based on a naming convention, JP-A 2005-222221 (Kokai) describes a method of reversing all arrows in a block diagram and cutting backward arcs as a serializing (closed loop removing) means of the block diagram. The document (T. Callenkamp, "Implementation of aReal0Time Simulator for Modeling the Dynamics of Closely Coupled Drive Systems", ISIE'93 IEEE International Symposium on Industrial Electronics, pp. 341-346) describes a method of dividing a history block (corresponds to a storage block) into the front side and back side when programming a block diagram.

Furthermore, as a technique of extracting a model from a program, there is known a technique of generating a UML (Unified Modeling Language) class diagram from a program written in an object oriented language (e.g., see JP-A 11-95990 (Kokai)) or the like.

No model base development tool relating to block diagram models realizes a conversion from source code to a model (block diagram). On the other hand, existing software is generally reused in development of control system software. In this case, since a model cannot be reconstructed from software using a conventional model base development tool, and therefore model information needs to be managed apart from software, but there are various problems such that managing software and model information separately requires enormous efforts. Furthermore, knowing the correspondence between instructions in source code and blocks (parts) of a block diagram is convenient for reuse of software.

SUMMARY OF THE INVENTION

According to an aspect of the present invention, there is provided with a program generating apparatus comprising:

a block diagram storing unit configured to store a block diagram including an input block element, a calculation block element, an output block element, data lines indicating data flows between the input block element, the calculation block element and the output block element, and a branch point that branches at least one of the data lines;

a block diagram dividing unit configured to divide the block diagram into an input side piece and one or more output side pieces at the branch point and connect a branch point block element to one end of each of data lines which have been connected to the branch point in the input side piece and the one or more output side pieces to generate a plurality of block diagram pieces each of which includes the input side piece or one of the one or more output side pieces;

a program instruction generator configured to generate program instructions for performing processing on a respective one of the block diagram pieces;

an execution sequence determining unit configured to determine an execution sequence of the generated program instructions so that the program instruction of the block diagram piece including the input side piece are executed before program instructions of the block diagram pieces including the one or more output side pieces;

a structural information generator configured to generate structural information of a respective one of the block diagram pieces; and a program generator configured to arrange the generated program instructions according to the execution sequence, write structural information of each of the block diagram pieces into a comment line of each of the program instructions corresponding to each of the block diagram pieces and thereby generate a program, wherein the structural information generator generates structural information of each of the block diagram pieces so that a block element at an end of each of the block diagram pieces is assigned to a child node of a root node of a tree structure, the block element being one of the input block element, the calculation block element, the output block element and the branch point block element, and a block element to be processed immediately before a block element assigned to a parent node different from the root node is assigned to a child node of the parent node, the former block element and the latter block element each being one of the input block element, the calculation block element, the output block element and the branch point block element.

According to an aspect of the present invention, there is provided with a program generating apparatus comprising:

a multilayer block diagram storing unit configured to store a multilayered block diagram including:

at least an input block element and an output block element out of the input block element, a calculation block element and the output block element;

a subsystem block;

data lines indicating data flows between at least the input block element, the output block element and the subsystem block out of the input block element, the calculation block element, the output block element and the subsystem block; and a subblock diagram of the subsystem block, which includes an input subblock element, a calculation subblock element, an output subblock element and data lines indicating data flows between the input subblock element, the calculation subblock element and the output subblock element;

a single layer block diagram generator configured to substitute the subblock diagram for the subsystem block in the multilayered block diagram, connect a data line connected to an input of the subsystem block to an input of the input subblock element, connect a data line connected to an output of the subsystem block to an output of the output subblock element and thereby generate a single layer block diagram;

a structural information generator configured to generate structural information of the single layer block diagram;

a program instruction generator configured to generate program instructions for performing processing on the single layer block diagram; and a program generator configured to arrange the program instructions, write structural information of the single layer block diagram into a comment line of the program instructions and thereby generate a program.

According to an aspect of the present invention, there is provided with a block diagram generating apparatus comprising:

a data reading unit configured to read data of a tree structure from a comment line of a program, the tree structure including an input block element, a calculation block element, an output block element and branch point block elements each of which indicates a branch of a data line, wherein each of the input block element, the calculation block element, the output block element and the branch point block elements has a block identifier and is assigned to a node different from a root node in the tree structure and;

a block diagram piece generator configured to generate a plurality of block diagram pieces by sequentially connecting a data line from a block element assigned to a child node to a block element assigned to a parent node of the child node starting from each child node of the root node toward each leaf node in the tree structure, the former block element and the latter block element each being one of the input block element, the calculation block element, the output block element and the branch point block elements; and a combination unit configured to generate a block diagram to which the block diagram pieces are combined, by integrating branch point block elements having identical block identifiers among different block diagram pieces into a branch point.

According to an aspect of the present invention, there is provided with a block diagram generating apparatus comprising:

a tree structure reading unit configured to read data of a tree structure in which block elements are assigned to nodes different from a root node, from a comment line of a program, the block elements including at least an input block element and an output block element out of the input block element, the output block element and a calculation block element, a calculation subblock element, a first input subblock element that receives data from a source element of the first input subblock element, a second input subblock element that sends out data received by the first input subblock element, a first output subblock element that receives data from a source element of the first output subblock element and a second output block element that outputs the data received by the first output subblock element;

a block diagram piece generator configured to generate a plurality of block diagram pieces by sequentially connecting an element assigned to a child node to an element assigned to a parent node of the child node with a data line, starting from each leaf node in the tree structure toward each child node of the root node, the former element and the latter element each being one of the input block element, the output block element, the calculation block element, the calculation subblock element, the first input subblock element, the second input subblock element, the first output subblock element and the second output block element;

a single layer block diagram generator configured to generate a single layer block diagram into which the block diagram pieces are combined by integrating the first and second input subblock elements between different block diagram pieces into a single input subblock element and integrating the first and second output subblock elements between different block diagram pieces into a single output subblock element; and a multilayered block diagram generator configured to specify a subblock diagram in the single layer block diagram, the subblock diagram being formed by the single input subblock element, the calculation subblock element, the output subblock element and data lines connecting between the single input subblock element, the calculation subblock element and the output subblock element, substitute a subsystem block for the subblock diagram, connect a data line which has been connected to the input of the single input subblock element to the input of the subsystem block, connect a data line which has been connected to the output of the single output subblock element to the output of the subsystem block and thereby generate a block diagram, and generate and output a multilayered block diagram including both of the subblock diagram and the block diagram.

BRIEF DESCRIPTION OF THE DRAWINGS

FIG. 4 shows a block diagram information file which becomes input to a program generating apparatus;

FIG. 11 shows an execution sequence information file 223;

FIG. 12 shows a program 302 in which execution sequence information is inserted as a comment;

DETAILED DESCRIPTION OF THE INVENTION

Hereinafter, embodiments of the present invention will be explained with reference to the accompanying drawings.

Embodiment 1

Figure 1:
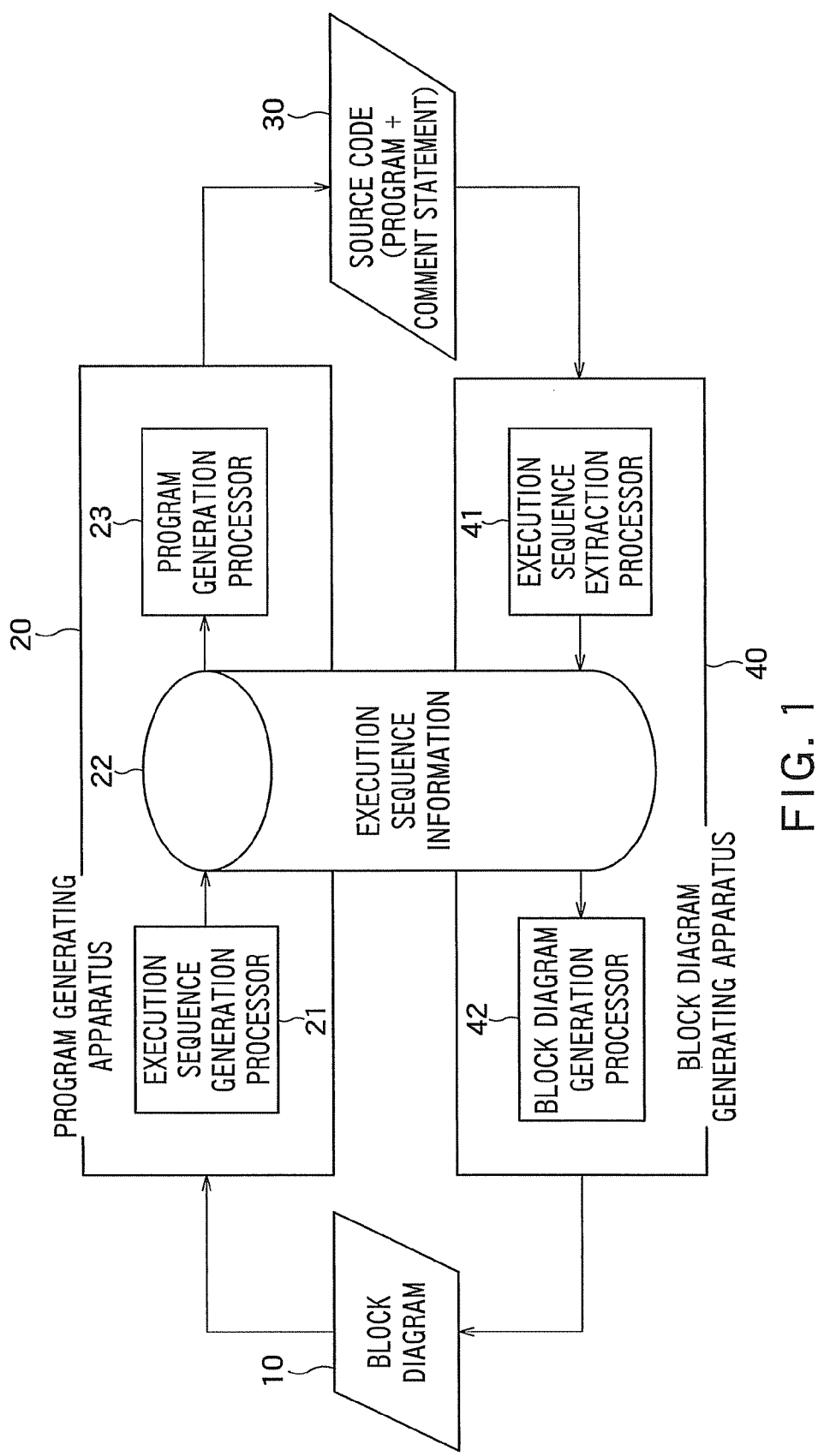
FIG. 1 is a block diagram showing a configuration of a block diagram—program interconversion system.

FIG. 1 shows a configuration of a block diagram—program interconversion system according to an embodiment of the present invention. In FIG. 1, reference numeral 10 denotes a block diagram which becomes input to a program generating apparatus, 20 denotes the program generating apparatus and 30 denotes a program (source code) generated by the program generating apparatus. A block diagram generating apparatus 40 receives the program 30 as input, generates the block diagram 10 and outputs the block diagram 10 generated. The program generating apparatus 20 and block diagram generating apparatus 40 are executed, for example, as execution of a computer program on a personal computer (PC) including a CPU and memory or the like.

Hereinafter, an overview of the block diagram—program interconversion system in FIG. 1 will be explained first and then details of the present system will be explained more specifically.

The program generating apparatus 20 is made up of an execution sequence generation processor 21 that generates execution sequence information 22 from the block diagram 10 and a program generation processor 23 that generates the program 30 from the execution sequence information 22.

The execution sequence generation processor 21 reads a block diagram (see FIG. 2 which will be described later) from a storage unit storing the block diagram (not shown). That is, the execution sequence generation processor 21 is provided with a block diagram reading unit that reads a block diagram. The block diagram includes an input block element, a calculation block element, an output block element, data lines that show a flow of data between the input block element, the calculation block element and the output block element, and at least one of branch point that branches at least one of the data line. The input block element is a block that performs processing defined for each type of block and outputs a processed signal, the output block is a block that performs processing defined for each type of block on a signal inputted to itself and the calculation block element is a block that performs processing defined for each type of block on a signal inputted to itself and outputs the processed signal.

The execution sequence generation processor 21 divides a block diagram into an input side and an output side at a branch point and thereby generates an input side piece and one or more output side pieces. When, for example, there are a plurality of branches from the branch point to the output side and these branches are not combined again, the execution sequence generation processor 21 generates the respective output side pieces according to the respective branches and generates, when the branches are combined again, one output side piece. The execution sequence generation processor 21 connects a branch point block element to one end of a data line which has been connected to a branch point at an input side piece and each output side piece and thereby generates a plurality of block diagram pieces each of which includes the input side piece or one of each output side piece (see FIG. 5 which will be described later). The processing described in the present paragraph corresponds to processing of a block diagram dividing unit and the execution sequence generation processor 21 is provided with the block diagram dividing unit.

The execution sequence generation processor 21 generates structural information of a block diagram piece for each block diagram piece. That is, the execution sequence generation processor 21 is provided with a structural information generator that generates structural information of each block diagram piece. The structural information of each block diagram piece is generated so that an end block element in each block diagram piece is assigned to a child node of a root node of a tree structure and a block element that performs immediately preceding processing assigned to each parent node is assigned to the child node of each parent node which is different from the root node (see FIG. 6 and FIG. 11 which will be described later).

The execution sequence generation processor 21 determines an execution sequence of program instructions that realize processing on each block diagram piece. More specifically, the execution sequence generation processor 21 determines the execution sequence of the respective program instructions so that program instructions corresponding to the block diagram piece including the input side piece are executed before program instructions corresponding to the block diagram pieces including the output side pieces. In this way, the execution sequence generation processor 21 is provided with an execution sequence determining unit that determines the execution sequence of the respective program instructions.

Figure 6:
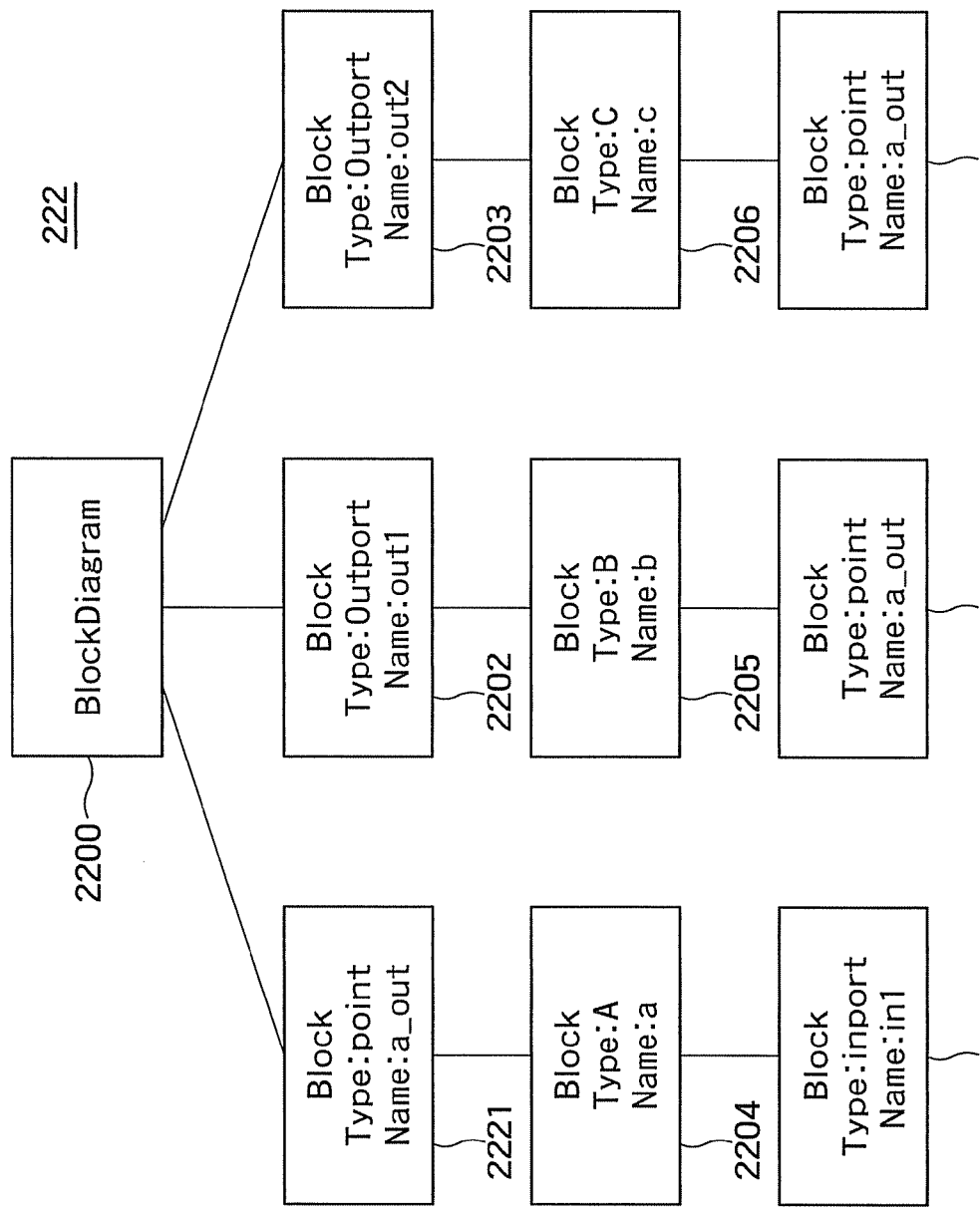
FIG. 6 shows a data structure 222 of a set of block diagram pieces.

The information including structural information of each block diagram piece generated by the structural information generator and the execution sequence of the respective program instructions determined by the execution sequence determining unit together corresponds to the execution sequence information 22 and this execution sequence information 22 becomes the output of the execution sequence generation processor 21. FIG. 6 shows an example of the execution sequence information 22. The figure implies that program instructions corresponding to block diagram pieces on the left side of the figure are to be executed ahead of others. Details of FIG. 6 will be described later.

Figure 8:
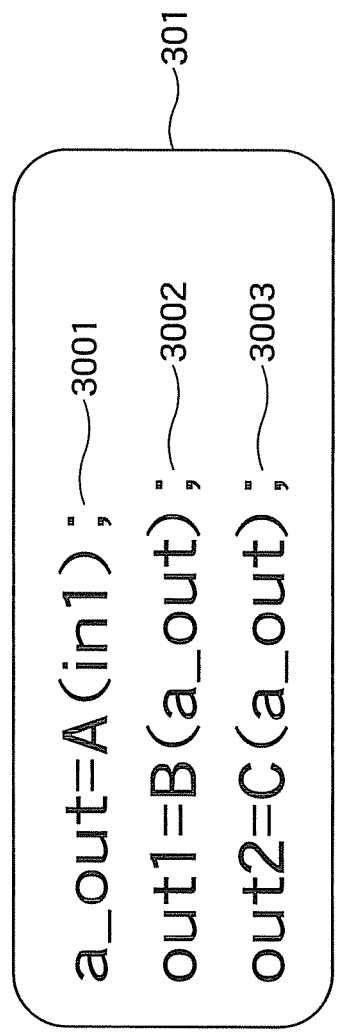
FIG. 8 shows an example of program 301.

The program generation processor 23 generates program instructions that realize processing on each block diagram piece (see FIG. 8 which will be described later). The program generation processor 23 then arranges each program instruction generated according to the execution sequence determined by the execution sequence determining unit, writes the structural information of each block diagram piece into a comment line of each program instruction corresponding to each block diagram piece and thereby generates the program 30 (see FIG. 12 which will be described later). The program generation processor 23 is provided with a program instruction generator that generates a program instruction for performing processing on each block diagram piece and a program generator that generates a program from each generated program instruction and structural information of each block diagram piece according to the execution sequence.

The block diagram generating apparatus 40 is made up of an execution sequence extraction processor 41 that extracts the execution sequence information 22 from the program 30 and a block diagram generation processor 42 that generates the block diagram 10 from the execution sequence information 22.

The execution sequence extraction processor 41 reads structural information of block diagram pieces from each comment line of the program 30. A set of structural information of the read block diagram pieces has a tree structure and the data of this tree structure corresponds to the execution sequence information 22. In this tree structure, the input block element, calculation block element, output block element and branch point block element indicating a branch of the data line are assigned to their respective nodes different from the root node. The execution sequence extraction processor 41 is provided with a data reading unit that reads the data of the tree structure from a storing unit storing the tree structure, that is, the execution sequence information 22 from each comment line of the program 30.

The block diagram generation processor 42 connects data lines from a block element assigned to a child node toward a block element assigned to a parent node of the child node sequentially from each child node of the root node to each leaf node of the tree structure, and thereby generates a plurality of block diagram pieces. The block diagram generation processor 42 then integrates branch point block elements having an identical block identifier among different block diagram pieces into a branch point, and thereby generates a block diagram to which the respective block diagram pieces are combined. In this way, the block diagram generation processor 42 is provided with a block diagram piece generator that generates a plurality of block diagram pieces from the execution sequence information 22 and a combination unit (integration unit) that combines (integrates) a plurality of block diagram pieces to generate a block diagram.

Hereinafter, the block diagram—program interconversion system in FIG. 1 will be explained in further detail.

Figure 2:
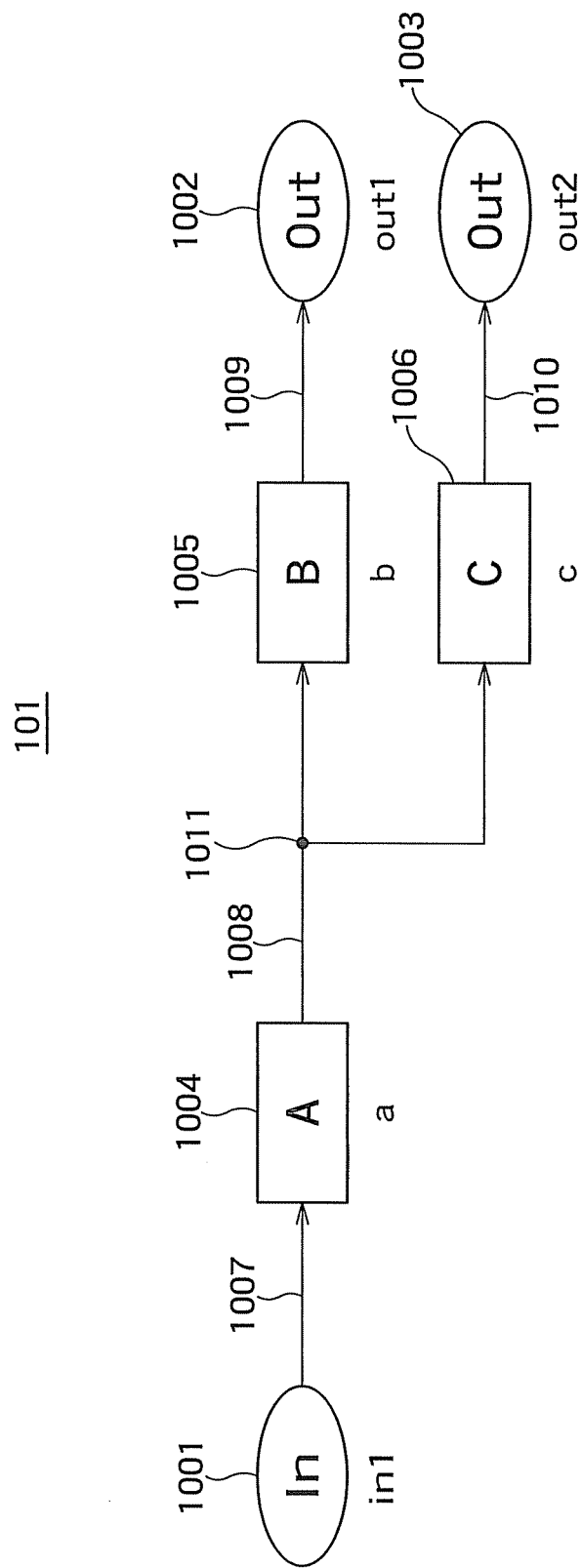
FIG. 2 is block diagram 101 including a branch point.

FIG. 2 shows an example 101 of the block diagram 10. Reference numeral 1001 denotes an input block element in1, 1002 and 1003 denote output block elements out1 and out2, 1004, 1005 and 1006 denote calculation block elements a, b and c, 1007 to 1010 denote signal lines (correspond to data lines of the present invention), and 1011 denotes a branch point. "In", "Out", "A", "B" and "C" in the figure represent types of block element and "in1", "a", "b", "c", "out1" and "out2" represent names that identify block elements. The block diagram 101 shows that a signal inputted from the input block element 1001 is subjected to processing A and processing B in that order and the resulting signal is outputted from the output block 1002, and the signal inputted from the input block element 1001 is subjected to processing A and processing C in that order and the resulting signal is outputted from the output block 1003.

Figure 3:
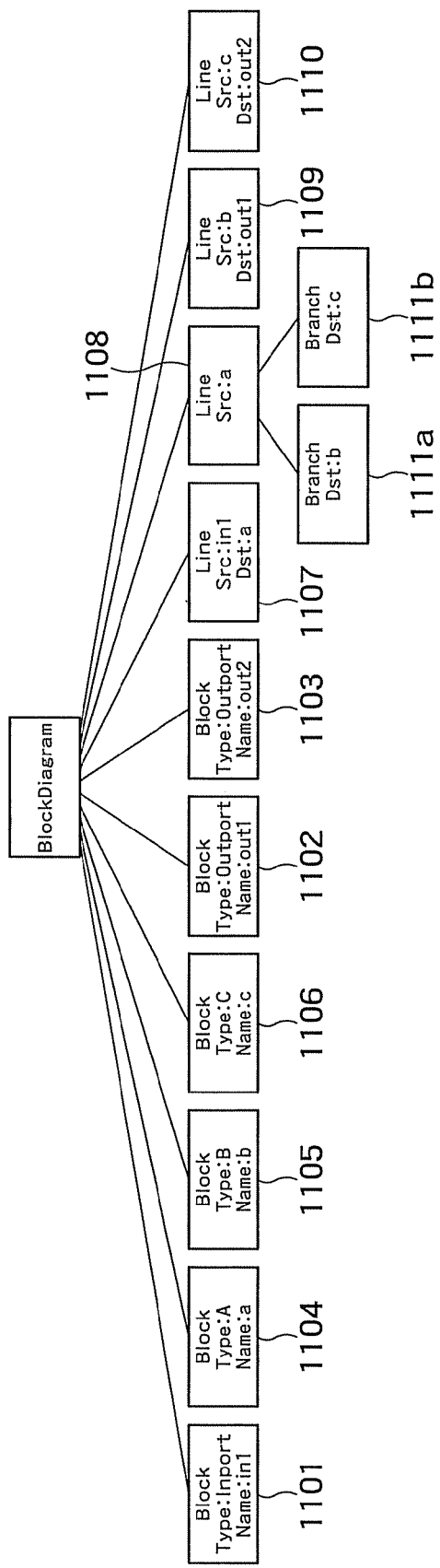
FIG. 3 shows a data structure 102 of a block diagram on a computer.

FIG. 3 shows an example 102 of data structure when the block diagram 101 is handled inside the program generating apparatus 20 or block diagram generating apparatus 40. Reference numerals 1101 to 1106 denote the block elements 1001 to 1006, and 1107 to 1110 denote the signal lines.

In addition to a type attribute and name attribute, a block element has attributes defined for each type of block and attributes such as the number of input terminals of a block. Attributes defined for each type of block include a constant in the case of a block having a function of multiplying by a constant, amplitude and frequency in the case of a block having a function of generating a sine wave. Attributes defined for each type of block such as constant are not used when generating execution sequence information, and are therefore not displayed here. Furthermore, in the block diagram 101, the numbers of input terminals of the calculation block element and output block element are all one (the number of input terminals of the input block element is 0), and are therefore not displayed here. A block diagram having a block with a plurality of input terminals will be explained in Embodiment 2.

A signal line has the names and terminal numbers of block elements at a start point and end point as attributes, but as described above, the terminal numbers will be omitted here. Furthermore, a branch point is expressed by a combination of a signal line element having only a start point attribute and a branch line element having only an end point attribute such as 1108, 1111a to 1111b.

The block diagram 101 is inputted to the program generating apparatus 20, for example, in a text file format that expresses the data structure 102. FIG. 4 shows an example of file that expresses the data structure 102.

Figure 5:
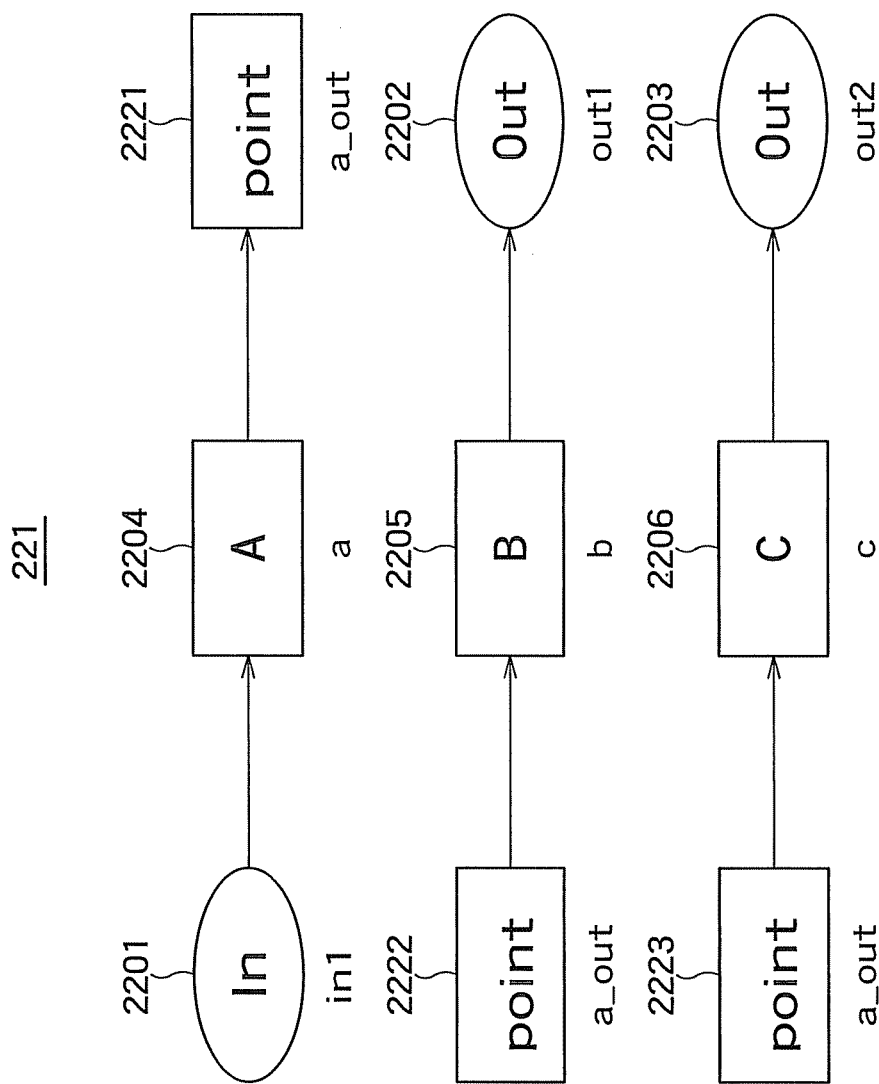
FIG. 5 shows a set of block diagram pieces 221 which is part of execution sequence information.

FIG. 5 shows an example 221 of a set of block diagram pieces (execution sequence information 22) generated by the execution sequence generation processor 21 from the block diagram 101 in FIG. 2. Reference numerals 2201 to 2206 denote block elements corresponding to block elements 1001 to 1006. Reference numerals 2221 to 2223 denote branch point blocks resulting from dividing the branch point 1011 into the input side and output side. It is possible to judge that these branch point blocks result from dividing the same branch point because the name attributes of the branch point blocks are the same (a_out).

FIG. 6 shows an example of data structure 222 of the execution sequence information indicating the set of block diagram pieces 221. The example of data structure 222 has a tree structure and each partial tree whose root is the child element 2220 of the root corresponds to each block diagram piece in FIG. 5. The example of data structure 222 is also called an "execution sequence tree".

An overview of processing of the execution sequence generation processor 21 will be explained with reference to a flowchart shown in FIG. 7 assuming that the block diagram 101 shown by the data structure 102 is the input and the execution sequence information 221 shown by the data structure 222 is the output.

Figure 7:
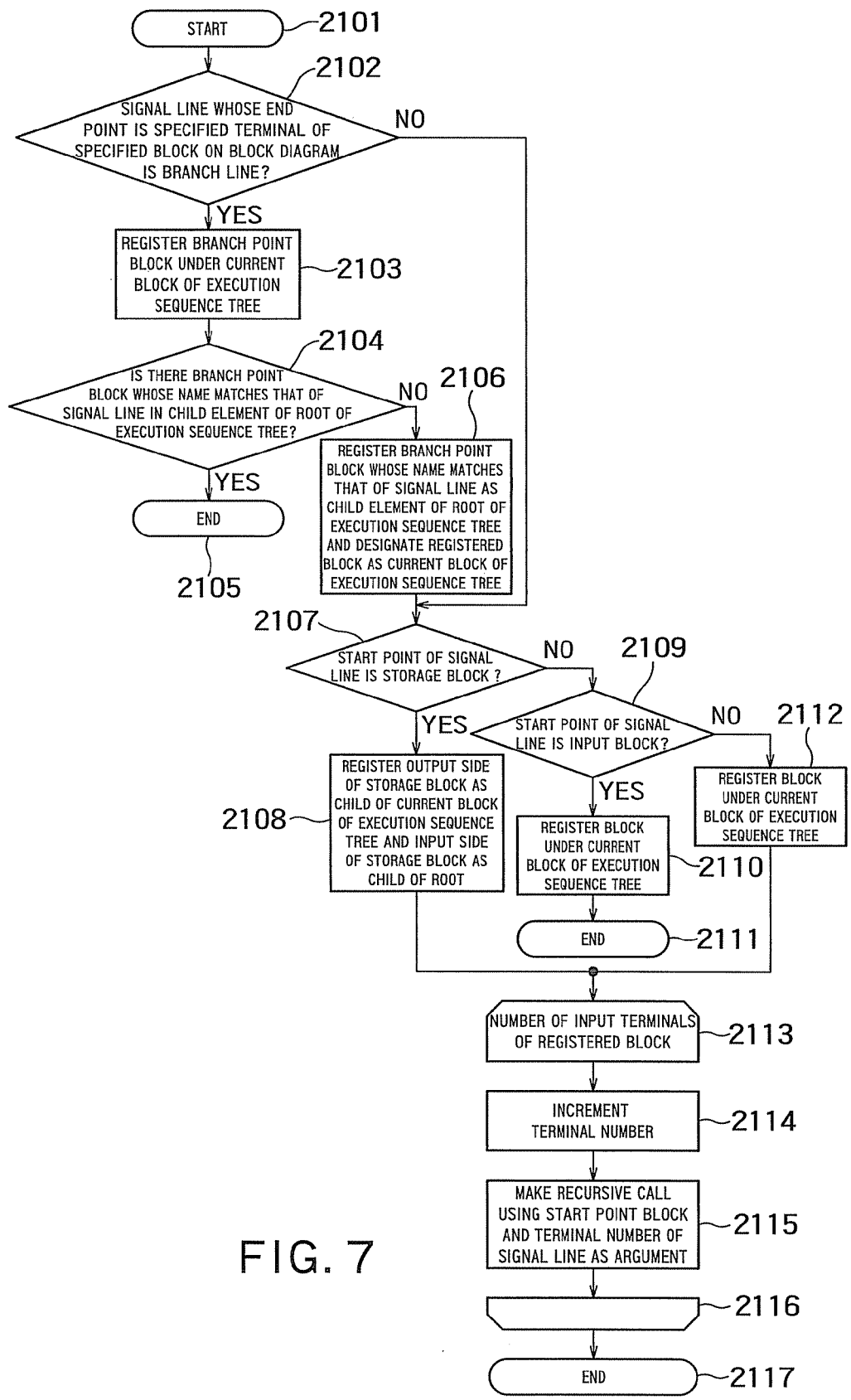
FIG. 7 is a flowchart of processing of an execution sequence information generator.

The execution sequence generation processor 21 generates execution sequence information by repeating the processing of adding an output block element to the root of the execution sequence tree 222 as a child element for each output block element of the data structure 102 first and then the processing shown in the flowchart in FIG. 7 using the output block element as the current block.

The data structure 102 has two output blocks of 1102 and 1103. First, the out1 output block element 1102 is added to right under the root of the execution sequence tree 222 as an out1 output block element 2202 and processing is performed from start 2101 of the flowchart in FIG. 7. Since the signal line element 1109 whose end point is the out1 output block element 1002 is not a branch line, judgment 2102 results in "No" and the process moves on to judgment 2107. Since the calculation block element 1105 which is the start point of the signal line 1109 is not a storage block, judgment 2107 results in "No" and the process moves on to judgment 2109. Since the calculation block element 1105 which is the start point of the signal line 1109 is not an input block, either, judgment 2109 also results in "No" and the process moves on to processing 2112 and a block element 2205 (=block element 1105) is registered as a child element of the out1 output block element 2202.

Next, the processing of a loop 2113 is performed and when the block diagram is made up of only block elements having not more than one input terminal, the processing from a loop end 2113 to a loop end 2116 is equivalent to executing processing 2115 once. The processing 2115 recursively calls the processing starting from the start 2101 using the calculation block element 1105 which is the start point of the signal line 1109 as the current block.

Since the signal line whose end point is the block element 1105 is a branch line 1111a, judgment 2102 results in "Yes" and the process moves on to processing 2103. The processing 2103 registers a branch point block 2222 under the current block 2205 and the process moves on to judgment 2104. As for the name attribute of the branch point block to be registered in this case, such a method may be adopted that if the corresponding signal line on the block diagram has a name, the name may be adopted or if the signal line has no name, a rule may be set and the signal line may be named according to the rule. Here, since the signal corresponds to the output of the block a (block element 1004) on the block diagram, suppose a name attribute a_out is set.

Since there is no branch point block having the name attribute of "a_out" in the child element of a root 2200 of the execution sequence tree, judgment 2104 results in "No" and a branch point block 2221 is registered through processing 2106. Since the calculation block 1104 which is the start point of the signal line 1108 is neither a storage block nor an input block, judgments 2107 and 2109 result in "No" and a block element 2204 (=block element 1104) is registered through processing 2112 as a child element of the branch point block 2221.

Next, processing 2115 recursively calls the processing starting from the start point 2101 using the block element 1104 as the current block. Since the signal line 1107 whose end point is the block element 1104 is not a branch line, judgment 2102 results in "No" and since the input block element 1101 which is the start point of the signal line 1107 is not a storage block but an input block, judgment 2107 results in "No" and judgment 2109 results in "Yes" and an input block element 2201 is added as a child element of 2204 through processing 2110 and the process returns to the calling source at end 2111.

The calling source is 2115, the process is repeatedly returned to the calling source by end 2117 twice and the processing on the output block element 1002 ends.

Block elements 2203, 2206 and 2223 are registered by also performing processing on the output block element 1103 (1003) which is another output block element of the data structure 102 according to the flowchart in FIG. 7. Here, since the branch point block named "a_out" exists as a child element (block element 2221) of the root of the execution sequence tree, judgment 2104 after the block element 2223 is registered in processing 2103 results in "Yes" and the process ends at end 2105.

When the execution sequence tree (execution sequence information) is generated according to the above described algorithm, as for the order in which block diagram pieces are generated, a block diagram piece made up of 2222, 2205 and 2202 (see FIG. 5) is generated first, a block diagram piece made up of 2201, 2204 and 2221 is then generated and a block diagram piece made up of 2223, 2206 and 2203 is finally generated. However, when the actual program 30 is generated, the block diagram piece made up of 2201, 2204 and 2221 which are calculations on the input side of the branch point block needs to be calculated before the remaining two block diagram pieces which are calculations on the output side of the branch point block. Therefore, information on the execution sequence between block diagram pieces (partial trees) is added which indicates that a partial tree whose root is a branch point block out of partial trees whose roots are direct child elements of the execution sequence tree root 2200 is calculated before partial trees having branch point blocks having the same name as leaves. The data structure 222 in FIG. 6 indicates the execution sequence among block diagram pieces (partial trees) by writing the block diagram pieces to be calculated first on the left side.

The processing of the program generation processor 23 will be explained assuming the execution sequence information 221 (see FIG. 5) expressed by the data structure 222 as input. FIG. 8 shows an example of program 301 outputted in that case. When a program is generated from the execution sequence information, the last element of each block diagram piece (corresponds to the root of each partial tree in the execution sequence tree) becomes a value substituted by one statement of the program (corresponds to the left side in the case of a mathematical expression), the element immediately before the last element becomes the last calculation to be performed in one statement of the program and the input of each block becomes the output of the immediately preceding block. In FIG. 5, in the case of the block diagram piece made up of the block elements 2201, 2204, 2221, the output of the block 2201 becomes the input of the block element 2204 and the output of the block element 2204 is substituted into 2221. This is expressed in a programming language as 3001 in FIG. 8.

Figure 9:
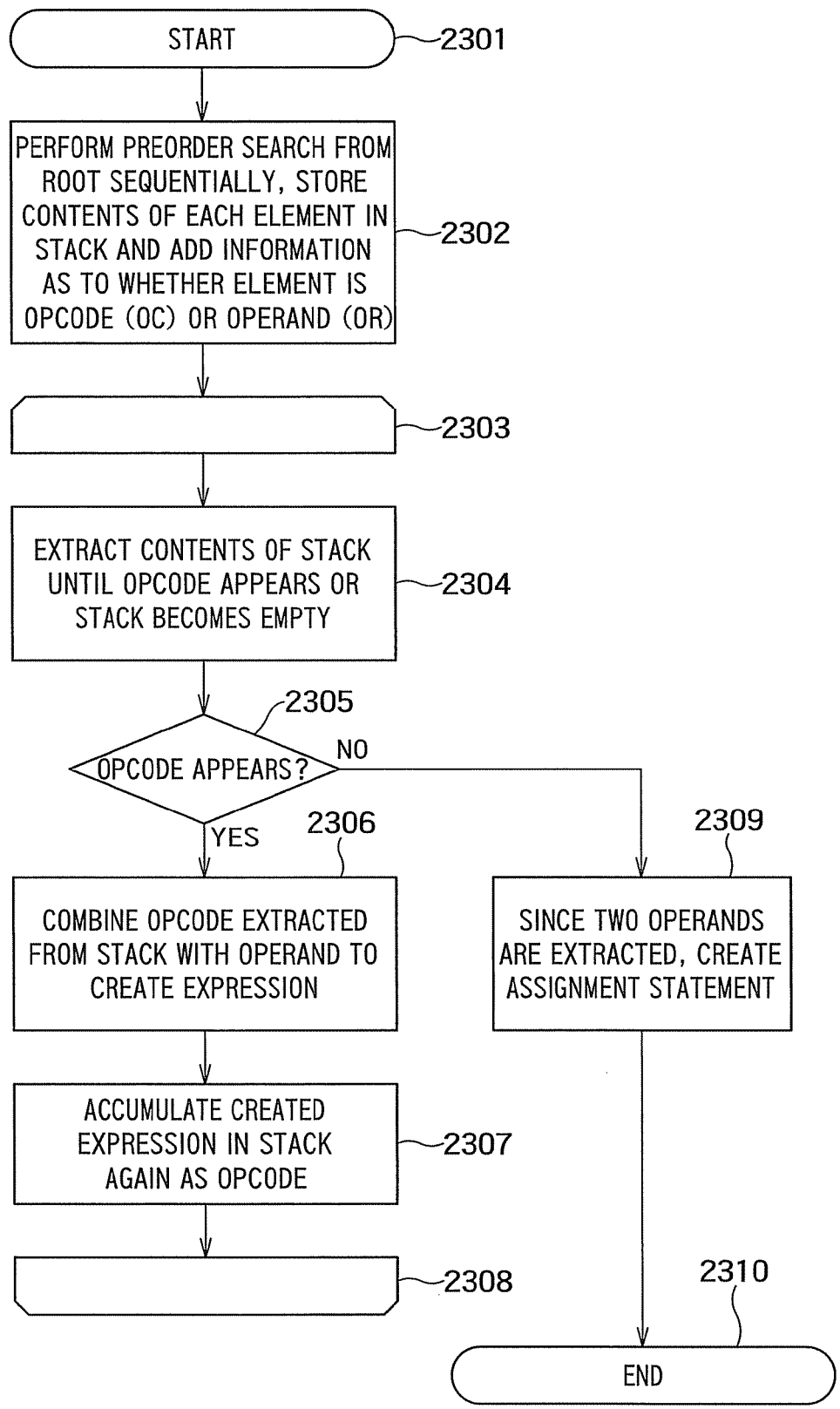
FIG. 9 is a flowchart of processing of the program generation processor.
Figure 10:
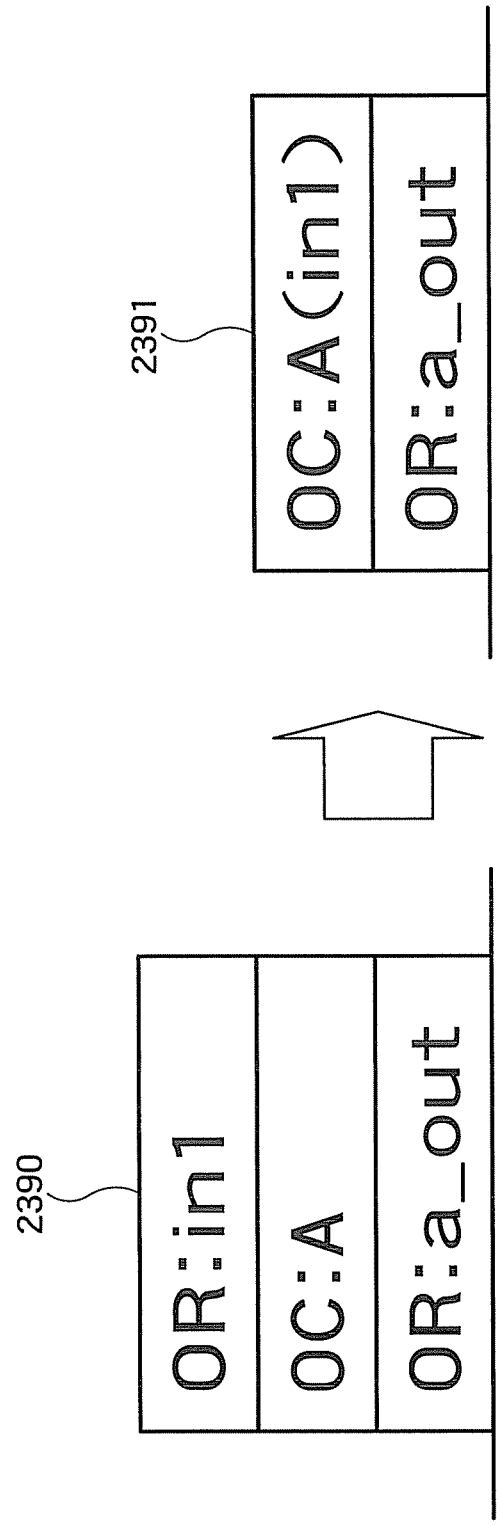
FIG. 10 shows contents of a stack.

As an example of processing of the program generation processor 23, there is a method of performing processing of a flowchart shown in FIG. 9 on each partial tree which is equivalent to a block diagram piece. The procedure for generating the program 3001 from the block elements 2201, 2204 and 2221 will be explained with reference to the flowchart in FIG. 9 and contents of a stack shown in FIG. 10. Reference numeral 2390 indicates a state in which all the contents of the partial tree are pushed in the stack through processing 2302. Reference numeral 2391 indicates a state in which an operand in1 and an opcode (function) A are then popped through processing 2304 and an expression created through processing 2306 is pushed in the stack again through processing 2307. After the processing 2307, a loop 2303 is executed again and since the contents of the stack are only an operand, the program instruction 3001 is generated through processing 2309 and the processing on the partial tree ends through end 2310.

Likewise, a program instruction 3002 is generated from the block diagram piece made up of the block elements 2222, 2205 and 2202 and a program instruction 3003 is generated from the block diagram piece made up of the block elements 2223, 2206 and 2203.

Here, the execution sequence information 222 can also be expressed in a text format, for example, as execution sequence information 223 shown in FIG. 11. Furthermore, since the execution sequence information 222 is delimited in units corresponding to one statement of the program, execution sequence information can be added as a comment for every one statement of the program in a text format. FIG. 12 shows an example 302 in which the execution sequence information 223 in FIG. 11 is inserted as a comment in the program 301 in FIG. 8. Here, "#" at the beginning of a line denotes a comment statement of programming language used in the program 301. In the program 302, as a method of distinguishing from other comment statements, a comment statement expressing execution sequence information is expressed by placing two "#"s consecutively at the beginning of a line. The program generation processor 23 generates and outputs the program 302 (corresponds to the source code 30 in FIG. 1) by inserting the execution sequence information 223 into the program 301 as a comment in this way. In addition to the method of describing a comment corresponding to the program using a comment statement in a programming language, identification information may be added as a comment statement in the programming language for every statement of a program instruction or on the other hand, the corresponding structural information may be given the same identification information and then managed using a method of saving the structural information in a file different from that of the program instruction.

The program generating apparatus 20 has been explained so far. Hereinafter, the block diagram generating apparatus 40 will be explained.

A program with the execution sequence information such as the program 302 in FIG. 12 inserted is inputted to the block diagram generating apparatus 40.

The execution sequence information extraction unit 41 extracts the comment unit from the program 302 and generates an execution sequence information file such as the execution sequence information 223 (see FIG. 11). The processing of the execution sequence information extraction unit 41 is realized, using a method of, for example, reading the program 302 line by line and writing only lines where two "#"s are placed consecutively at the beginning of a line out of the lines into an output file.

The block diagram generation processor 42 receives the execution sequence information 223 as input and generates the block diagram 10.

The flow of processing of the block diagram generation processor 42 will be explained based on an example where the data structure 222 of the execution sequence information (see FIG. 6) is converted to a data structure 102' of the block diagram shown in FIG. 14. The block diagram generation processor 42 performs the processing of a flowchart shown in FIG. 13 on all inputted child elements of the root of the execution sequence information 223.

The root 2200 of the data structure 222 includes three child elements of 2221, 2202 and 2203.

Here, processing is started from 2221 first. Since 2221 is a branch point block and the child element of the root 2200 of the execution sequence tree, 2221 becomes the input side of the branch point block and judgment 4202 results in "Yes". The child element of the current block acquired through processing 4203 is the block element 2204. Since the signal line having a name (a_out) that matches the current block has not been generated yet, judgment 4204 results in "No" and a signal line 1108' is generated through processing 4206. Since the block element 2204 which is the child element of the current block is not the output side of the storage block, judgment 4207 results in "No", and processing 4218 recursively calls the processing starting from 4201 by regarding the block element 2204 as the current block. Since the block element 2204 is a calculation block, judgment 4202 results in "No", and the block element 2204 is added to the data structure 102' as a block element 1104 through processing 4209. Since the block element 2204 is a calculation block, judgment 4210 results in "No" and the process moves on to processing of a loop 4212. Here, since all blocks on the data structure 222 of the execution sequence information have not more than one child element, all loops interposed between loop ends 4212 and 4222 are executed only once. An example where there are two or more child elements will be shown in Embodiment 2.

Since the child element of the block element 2204 is the input block element 2201, judgment 4213 results in "No" and a signal line 1107 whose start point is the block element 2201 and whose end point is the block element 2204 is generated through processing 4219. Since judgment 4220 results in "No", the processing starting from 4201 is called again assuming the input block element 2201 as the current block. Since judgment 4202 results in "No", the input block element 2201 is added to the data structure 102' as an input block element 1101 through processing 4209. Since the current block is the input block element 2201, judgment 4210 results in "Yes" and the process returns to the calling source. The calling source also repeats termination of processing at end 4223 twice and the processing on 2221 ends.

Figure 13:
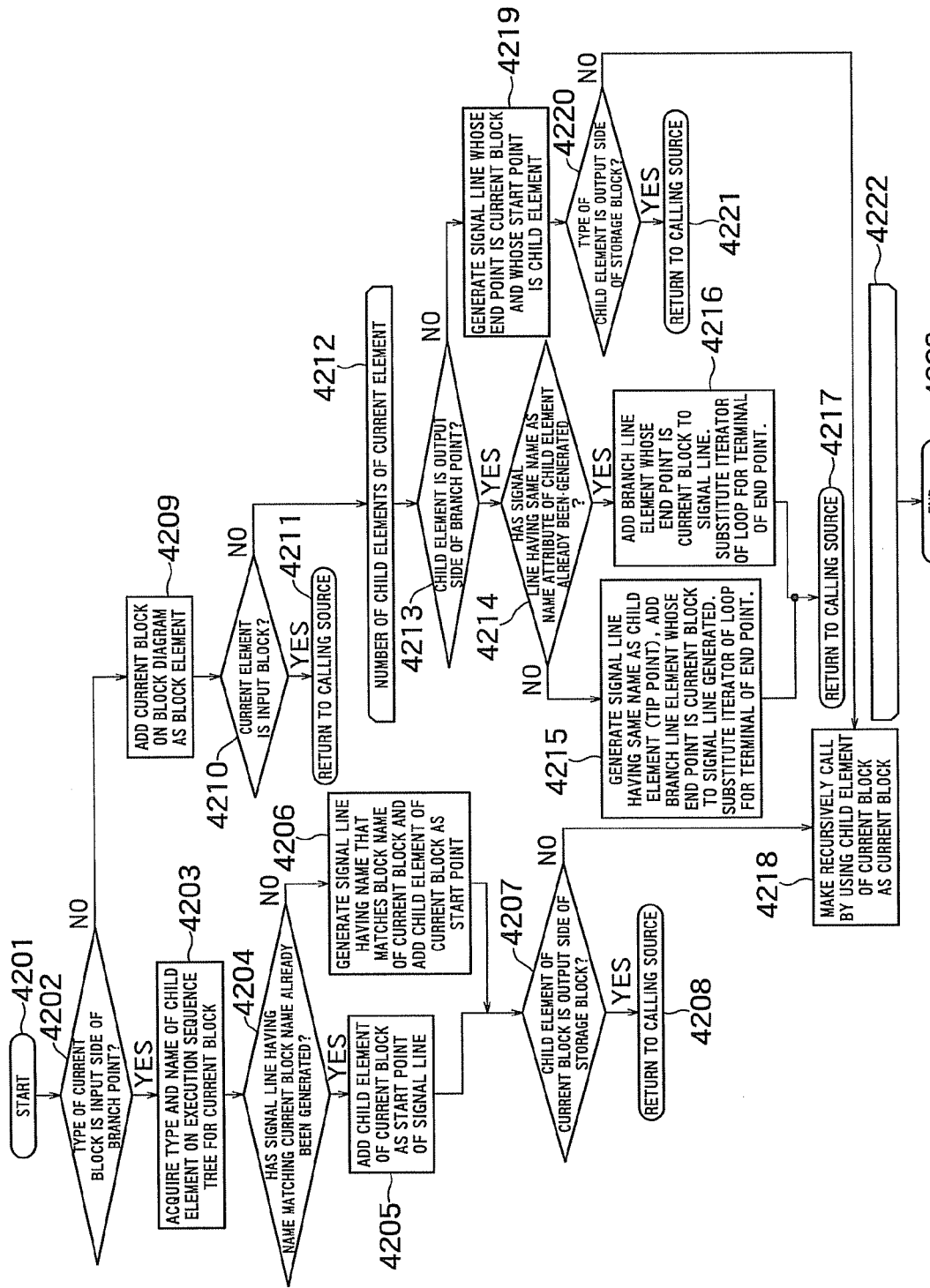
FIG. 13 shows a processing flow of the block diagram generating apparatus.
Figure 14:
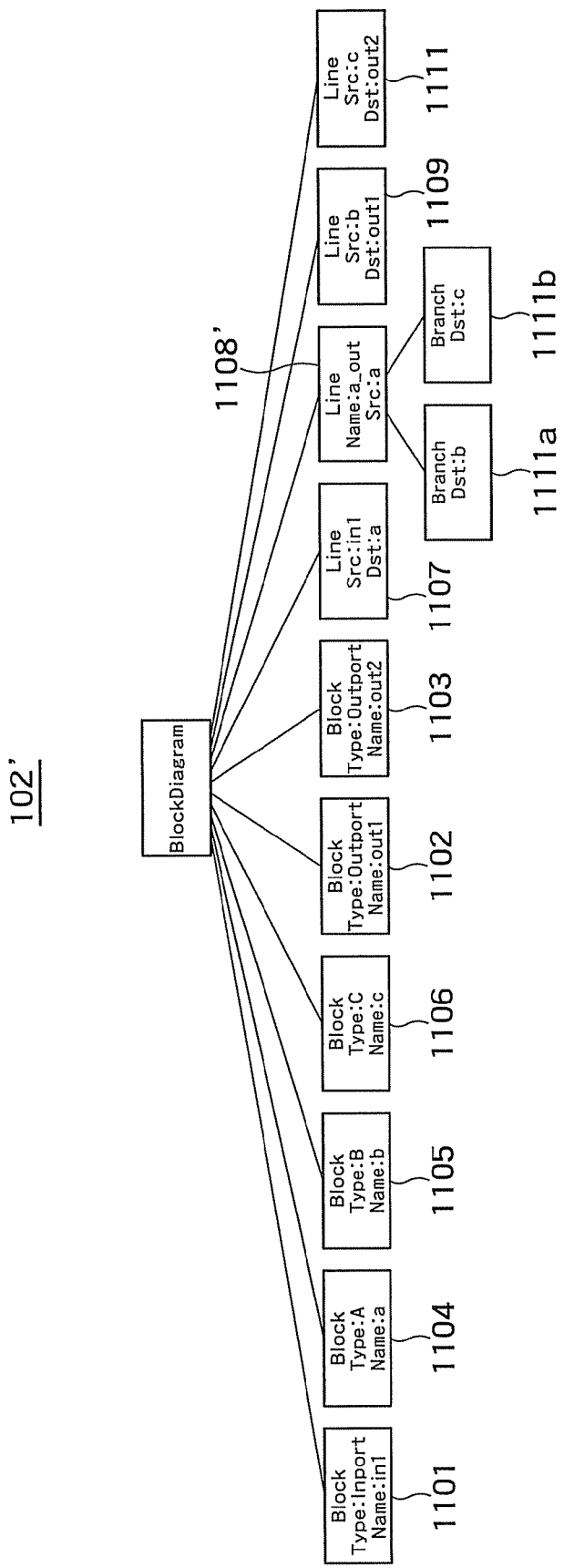
FIG. 14 shows a data structure 102' of the block diagram on a computer generated by the block diagram generation system.

Next, the processing in the flowchart of FIG. 13 is also performed on the child element 2202 which is the root of the data structure. Since 2202 is an output block element, judgment 4202 results in "No", an output block element 1102 is added to the block diagram through processing 4209. Since both judgment 4210 and judgment 4213 become "No", a signal line 1109 whose end point is the block 2202 and whose start point is the child element 2205 thereof is added to the block diagram. Since the child element 2205 is a calculation block, judgment 4220 results in "No", the processing starting from 4201 is called again through processing 4218 assuming the block 2205 as a current block. Since the block 2205 is a calculation block, judgment 4202 results in "No", the block 2205 is added to the block diagram as a block 1105 through processing 4209. Judgment 4210 also results in "No" and the process moves on to judgment 4213. Since the child element 2222 of the block 2205 is a branch point and a leaf of the execution sequence tree, the child element 2222 becomes the output side of the branch point and judgment 4213 results in "Yes". Since the signal line 1108' having the same name as the name a_out of the child element already exists, judgment 4214 results in "Yes", a branch line 1111*a* whose end point is the block 2205 is added to the signal line 1108'. The process returns to the calling source again through processing 4217 and the calling source also terminates the processing at end 4223.

Finally, processing 421 is also performed on the child element 2203 which is the root of the data structure. The flow of processing on the element 2203 is similar to the flow of processing on the element 2202, elements of the block diagram are generated in order of output block element 1103, signal line 1110, calculation block element 1106 and branch line 1111*b*, and the block diagram 102' is generated.

According to the present embodiment, the execution sequence information can be divided into units corresponding to one statement of the program, for example, the corresponding execution sequence information is easily inserted in the program as a comment. In this way, by using execution sequence information inserted in the program as a comment statement, it is possible to reconstruct the block diagram from the program and centralized management of the program and model information can be realized. That is, it is possible to generate a model from the execution sequence information inserted in the source code as a comment when software is reused and redesign a control system on the model basis, and model information need no longer be managed separately.

Embodiment 2

Figure 15:
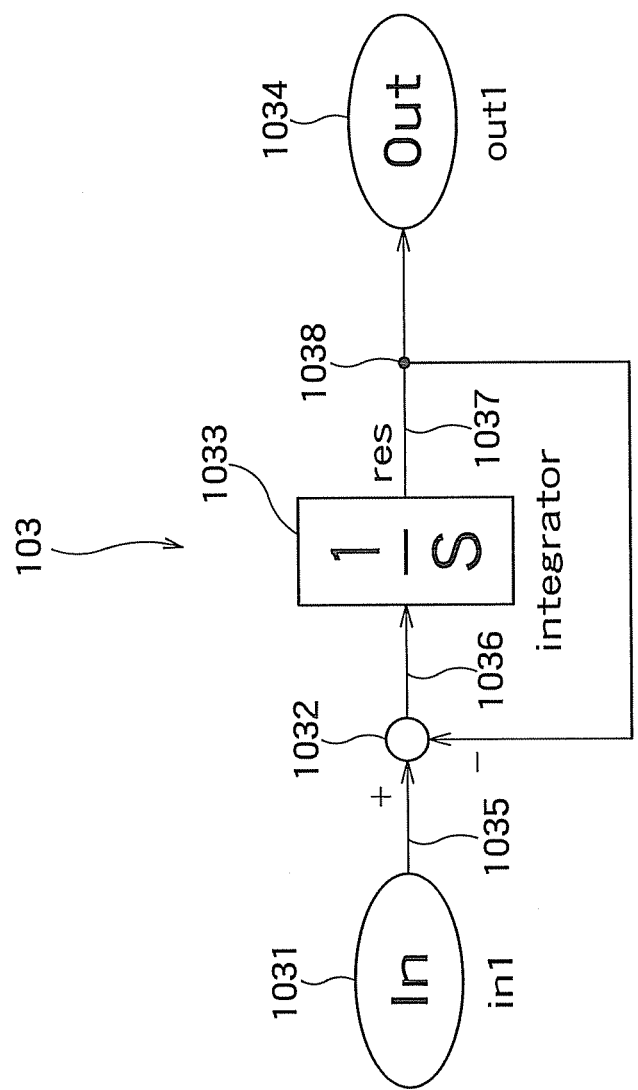
FIG. 15 is a block diagram 103 including a storage block and a multi-input block.

A second embodiment of the present invention will explain an example where a block diagram 103 shown in FIG. 15 is inputted to the program generating apparatus 20 of the block diagram—program interconversion system in FIG. 1. The block diagram 103 differs from the block diagram 101 in FIG. 2 in that the block diagram 103 has a calculation block 1032 having two input terminals and a storage block (storage calculation block) 1033, and the signal line (data line) 1037 is given a name (res). The storage block is one type of calculation block, but since the output of the block is determined by not only the input at the moment but also the inner state of the block (which generally depends on past inputs up to the instant), processing on the block includes recording and reading of the inner state data. Examples of the storage block include block elements such as integrator, unit time delay and transfer function.

The storage block (storage calculation block) (1) generates calculation data by performing a calculation using data received from a source block and storage data based on, of the data received from the source block element in the past, at least the latter and updates storage data using at least the data received from the source block element and (2) sends out the calculation data to the destination block element. The present embodiment is characterized in that the storage calculation block element can be handled by being divided into a first calculation block element that performs the processing in (1) and a second calculation block element that performs the processing in (2) (that is, divided into the input side and output side).

Figure 16:
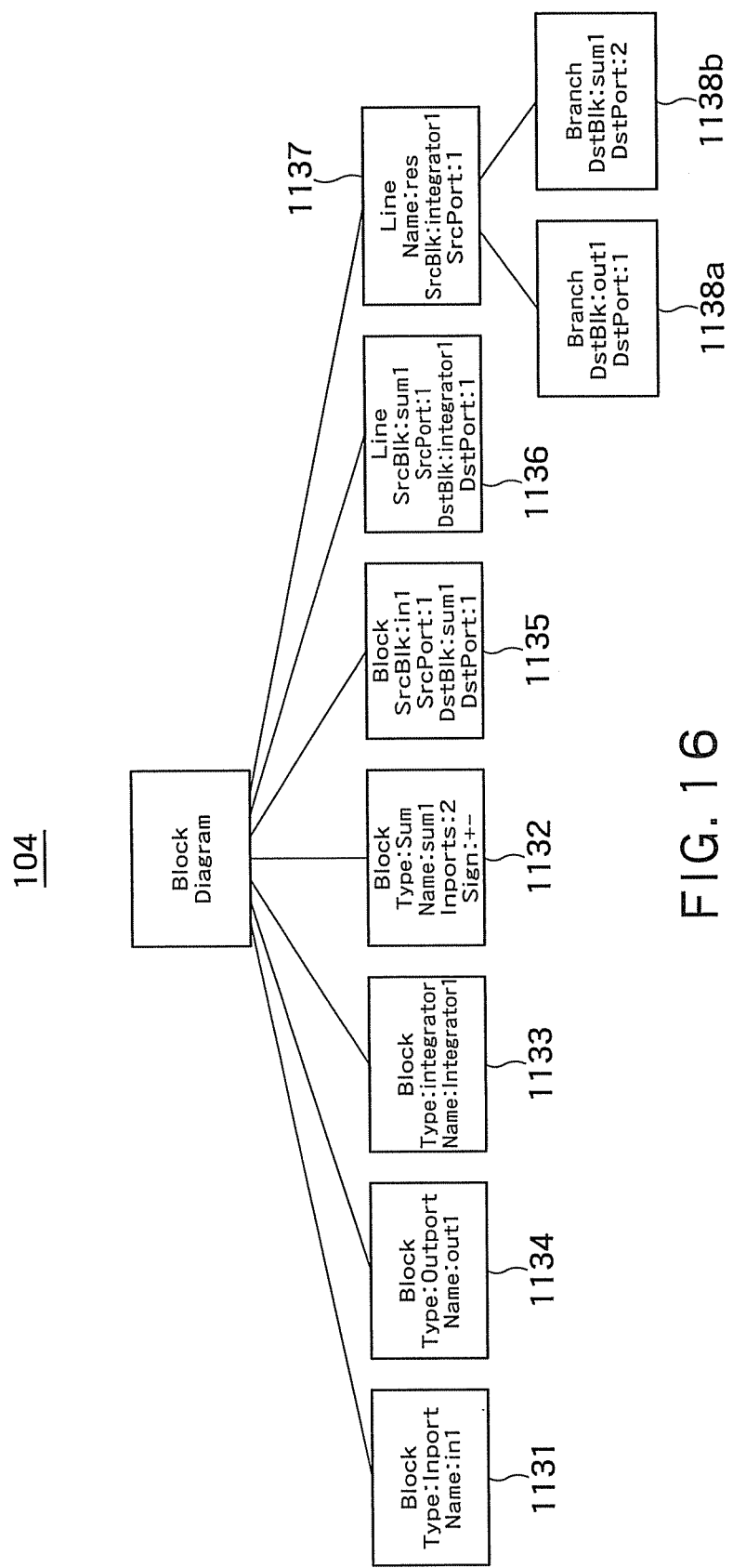
FIG. 16 shows a data structure 104 of the block diagram 103 on a computer.

FIG. 16 shows an example of data structure 104 when the block diagram 103 is handled inside the program generating apparatus.

A block element 1132 that expresses the calculation block element 1032 having two input terminals has an "Inports" attribute that expresses the number of input terminals. As for blocks having one input terminal, the Inports attribute is omitted. The signal line element and branch line element also have not only start point block/end point block attributes but also start point terminal and end point terminal attributes. An end point terminal of a branch line element 1138b that expresses a signal line that connects a branch point 1038 and the second terminal of the calculation block 1032 becomes 2. Furthermore, the calculation block element 1032 has a "sign" attribute. The type attribute of the calculation block element 1032 is "Sum" and the function of the "Sum" block is to carry out addition/subtraction on values of each input terminal according to the sign of the sign attribute. In the case of the block element 1032, the sign attribute is + − (plus and minus) and this means that a value obtained by subtracting the input of the input terminal 2 from the input of the input terminal 1 is outputted from the output terminal. Furthermore, the signal line element 1137 representing the signal line 1037 has a name attribute.

Figure 17:
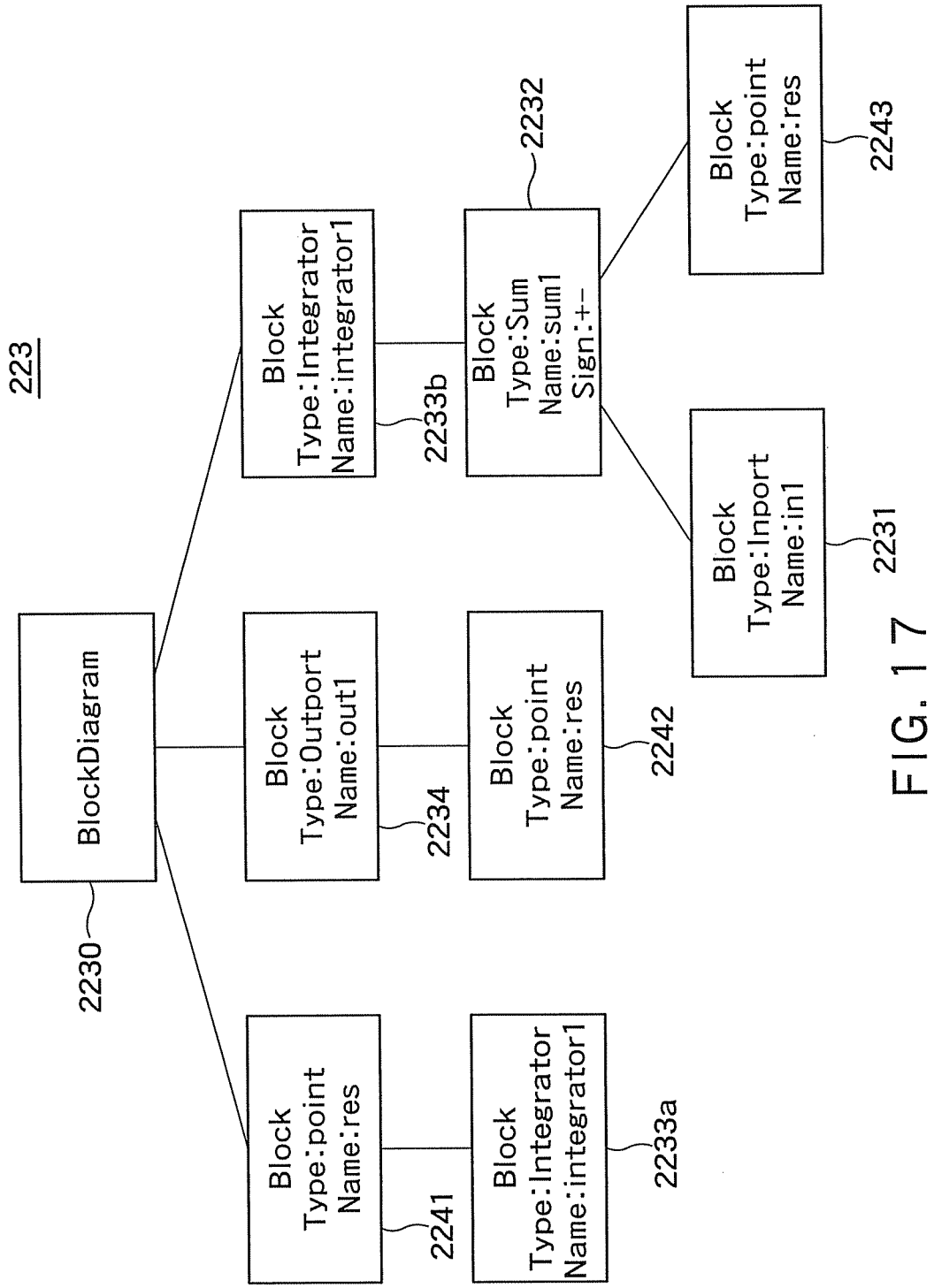
FIG. 17 shows a data structure 223 of execution sequence information.

FIG. 17 shows a data structure 223 of execution sequence information outputted when the data structure 104 in FIG. 16 is inputted to the execution sequence generation processor 21 shown in Embodiment 1. The execution sequence information is generated by adding an output block element 2234 which is the only output block element of the data structure 104 to right under a root 2230 of an execution sequence tree of the data structure 223 and performing the processing of the flowchart shown in FIG. 7 using the block element 2234 as the current block. The processing of generating blocks 2242 and 2241 through processing 2103, 2106 is similar to that in Embodiment 1, and the name of the signal line 1137 is used as the name attribute of the branch point element in this case. Next, since the block element 1033 is a storage block, 2233a and 2233b are generated through processing 2108. The processing of generating the calculation block 2232 is also similar to that in Embodiment 1, but since the calculation block 2232 has two input terminals, the loop interposed between the loop ends 2113 and 2116 is executed twice, the block 2231 is generated on a first lap and the block 2243 is generated on a second lap.

As in the case of Embodiment 1, the dependency relationship before and after a branch point is evaluated, the execution sequence between block diagram pieces is determined and the execution sequence tree 223 is thereby completed.

Figures 18, 19, 20:
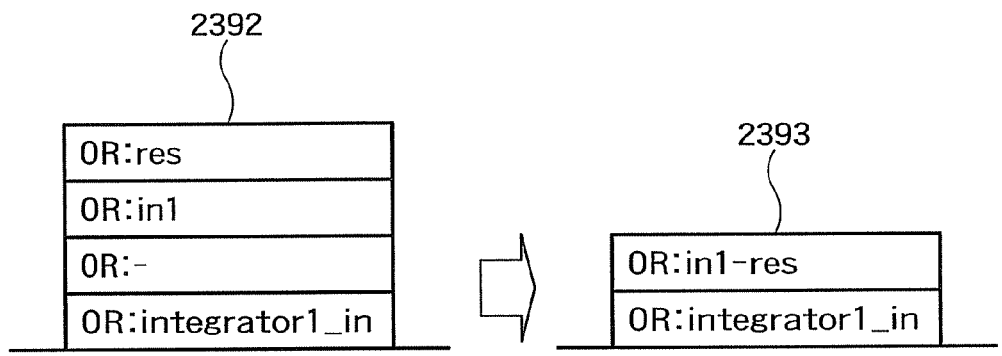
FIG. 18 shows an example of program 303.
FIG. 19 shows an example of program 304.
FIG. 20 shows contents of a stack.

The data structure 223 of the execution sequence information is inputted to the program generation processor 23 and the program 303 shown in FIG. 18 is generated.

In this case, the program generation processor 23 needs to generate processing of updating the value on the output side of the storage block in addition to processing 3013 of substituting a value into the input side of the storage block and processing 3011 of referencing the value on the output side of the storage block. Reference numeral 3014 shows an example where an integrator of a continuous time system is approximated using an Euler method (rectangle rule).

When an integrator is approximated using an Euler method, since

Output variable=output variable+input variable*sampling period,

3014 is generated by substituting 2233a into the output variable and 2233b into the input variable. "st" in 3014 denotes a sampling period.

The update processing when approximating the integrator using not the Euler method but Huen method (trapezoid rule) is expressed with the following two lines.

Output=input*sampling period/2+state

State=input*sampling period/2+output

Here, the "state" refers to a variable used for an inner calculation of the storage block.

Furthermore, the approximation of integration using the Huen method (trapezoid rule) can also be expressed with the following two lines.

Output=output+(input+state)*sampling period/2

State=input

In addition to the integrator, there are types such as delay element, transfer function and discrete time transfer function in the storage block.

In the case of a unit time delay (delay element), the update processing is:

Output=input

There are many combinations of transfer function blocks depending on the degree of the transfer function and approximation method, and when, for example, a linear transfer function expressed by $$\frac{b_0}{s - a_0}$$

is approximated using the Euler method, the update processing is expressed with the following three lines:

Output=$b_0$*state 1

State 0=input+$a_0$*state 1

State 1=state 1+state 0*sampling period

As another example, when a cubic transfer function expressed by $$\frac{b_2 s^2 + b_1 s + b_0}{s^3 - a_2 s^2 - a_1 s - a_0}$$

is approximated using the Euler method, the update processing is expressed with the following five lines:

Output=$b2$*state 1+$b1$*state 2+$b0$*state 3

State 0=input+$a2$*state 1+$a1$*state 2+$a0$*state 3

State 1=state 1+state 0*sampling period

State 2=state 2+state 1*sampling period

State 3=state 3+state 2*sampling period

Furthermore, as an example of discrete time transfer function, the update processing of a quadratic transfer function expressed by a transfer function $$\frac{b_1 z + b_0}{z^2 - a_1 z - a_0}$$

is expressed with the following four lines:

Output=$b1$*state 1+$b0$*state 2

State 0=input+$a1$*state 1+$a0$*state 2

State 2=state 1

State 1=state 0

When the storage block is expressed by a program, as shown in the program 303 of FIG. 18, it is a general practice to separately describe the processing of separating the input side from the output side of the storage block and updating the output side. This is intended to prevent the program from becoming complicated when the storage block is a high-degree transfer function block or when high-degree approximation is used during programming of the storage block expressed by a continuous time system. When programming is performed by dividing the storage block into the input side and the output side, dividing the execution sequence information at the part of the storage block has an effect of making the correspondence between the execution sequence information and one statement of a program easier and clearer.

On the other hand, when processing of a lower degree is used for the storage block as shown in the example of the program 303 in FIG. 18, it is also possible to describe the processing without separating the input side from the output side of the storage block. FIG. 19 shows an example of program 304 when the program is not divided at the part of the storage block. The execution sequence information when the program is not divided at the storage block can be generated by equalizing the processing on the storage block shown in the flowchart of FIG. 7 to the processing on a general calculation block.

As in the case of the block element 3013 in FIG. 18, an example where execution sequence information having a multi-input block is converted to a program will be explained with reference to the flowchart in FIG. 9 and contents of a stack shown in FIG. 20. First, 2392 is a state in which all the contents of a partial tree made up of elements 2233b, 2232, 2231 and 2243 are pushed in a stack through processing 2302. The processing on the calculation block 2232 in this case is expressed with an opcode "-". To realize such processing, the program generation processor 23 has information on the correspondence between the block type and calculation contents. Next, 2393 is a state in which an operand "res", operand "in1" and opcode "-" are popped through processing 2304 and an expression "in1-res" created through processing 2306 is pushed again in the stack through processing 2307. Finally, a loop 2303 is executed again after processing 2307 and since the contents of the stack are only an operand, the program 3013 is generated through processing 2309 and the processing on the partial tree ends at end 2310.

The information of the storage block divided into forward and backward portions is stored in the execution sequence information 223 in FIG. 17. Since the flowchart in FIG. 13 also includes the processing of connecting the input side and output side of the storage block, a block diagram can be generated (reconstructed) by also using the processing of the flowchart in FIG. 13 for the execution sequence information 223 in FIG. 17.

Embodiment 3

Figure 21:
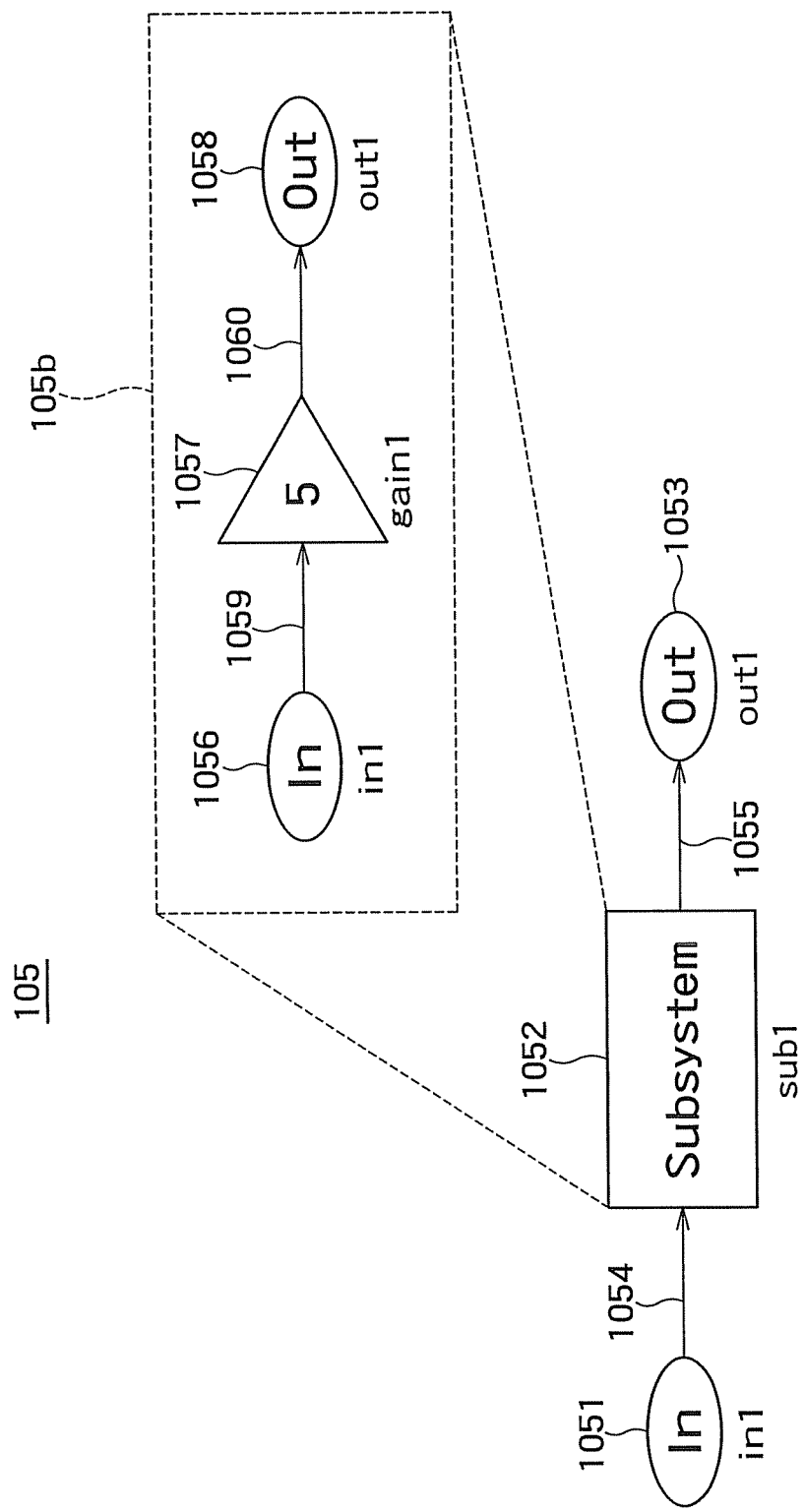
FIG. 21 is a block diagram 105 including a subsystem block.

A third embodiment shows an example where a block diagram (multi-layered block diagram) 105 shown in FIG. 21 is used as input to the block diagram—program interconversion system in FIG. 1.

The block diagram 105 differs from the block diagram 101 in FIG. 1 and the block diagram 103 in FIG. 15 in that the block diagram 105 has a subsystem block 1052 and is layered. Reference numeral 105b denotes a block diagram of the subsystem block 1052.

The block diagram of the subsystem block includes an input subblock element (subsystem input block), a calculation subblock element (subsystem calculation block), an output subblock element (subsystem output block) and data lines that indicate data flows between these elements.

Furthermore, the multilayered block diagram which becomes input in the present embodiment includes, of an input block element, calculation block element and output block element, at least the input block element and output block element, the above described subsystem block and data lines that indicate data flows between these elements. The multilayered block diagram is stored in the multilayer block diagram storing unit and read by the program generating apparatus.

Figure 22:
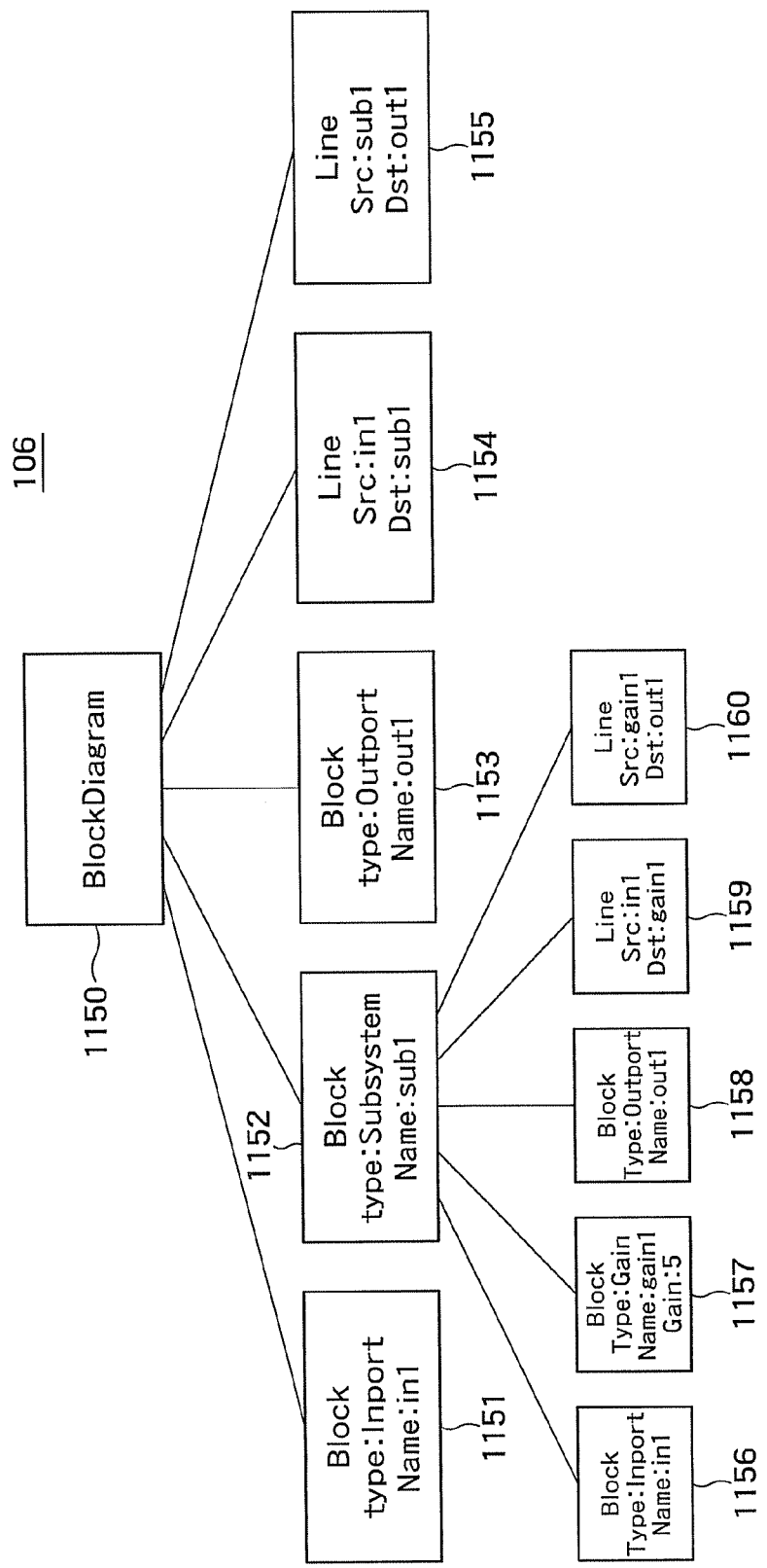
FIG. 22 shows a data structure 106 of the block diagram 105 on a computer.

FIG. 22 shows an example of data structure 106 when the block diagram 105 is handled inside the program generating apparatus 20. Here, a block element 1157 is a Gain block that has the function of multiplying a constant and the "Gain" attribute of the block element 1157 that expresses the block element 1057 of FIG. 21 indicates the value of a constant to be multiplied. That is, the block element 1157 means outputting of a value multiplying the input to fivefold.

When code generation is performed on a layered block diagram, the block diagram is converted to a single layer block diagram and execution sequence information is then generated through the processing by the execution sequence generation processor 21 shown in Embodiment 1. The layered block diagram is converted to a single layer by repeating the processing of (1) adding a subsystem name to the start of names of a calculation block element and signal line (data line) inside the subsystem to convert the calculation block element and signal line to a calculation block element and signal line of a one rank higher system, (2) converting input/output blocks of a subsystem to a subsystem input block and subsystem output block of a one rank higher system and (3) changing, of signal lines inside the one rank higher system, signal lines whose start point or end point is a subsystem to signal lines whose start point or end point is a subsystem input block or subsystem output block according to the number of layers.

Figure 23:
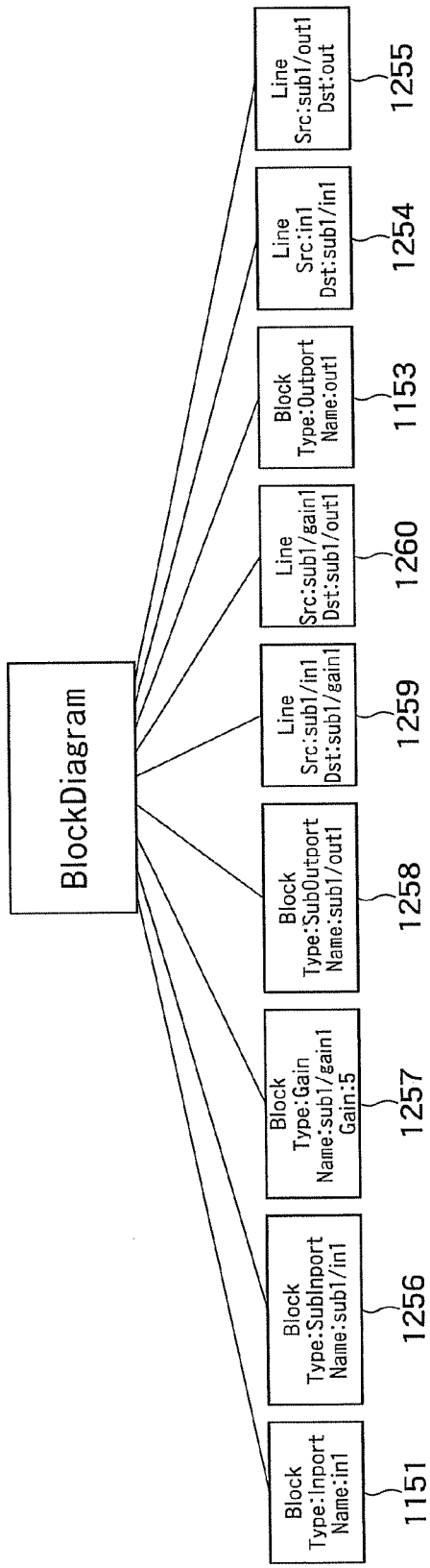
FIG. 23 shows a data structure 107 of the data structure 106 converted to a single layer.

FIG. 23 shows a data structure 107 of the subsystem of the data structure 106 converted to a single-layer block diagram. In contrast to the data structure 106, reference numeral 1156 which is an input block element inside the subsystem is assumed to be a subsystem input block 1256, 1158 which is an output port inside the subsystem is assumed to be a subsystem output port 1258 as elements of a one rank higher block diagram. Furthermore, 1257, 1259 and 1260 which correspond to 1157, 1159 and 1160 which are the block elements and signal lines inside the subsystem with names (sub1) of the subsystem block added to the start of the name attributes are assumed to be elements of a one rank higher block diagram. Furthermore, start points or end points of 1154 and 1155 which are signal lines of the one rank higher block diagram and whose start points or end points are subsystem blocks are replaced by a subsystem input block and subsystem output block as 1254 and 1255. This makes it possible to realize a conversion to the data structure 107.

Figure 24:
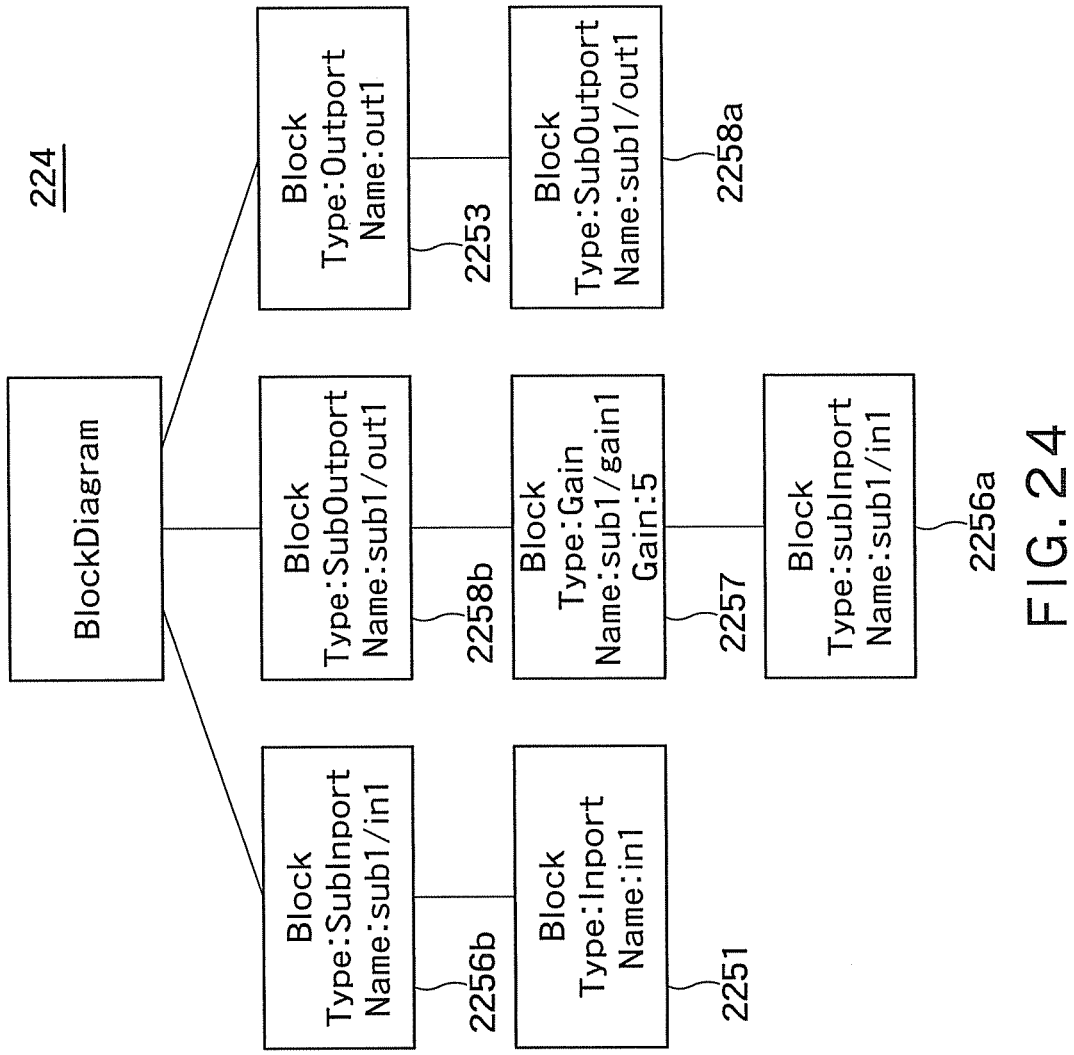
FIG. 24 shows execution sequence information 224.
Figure 25:
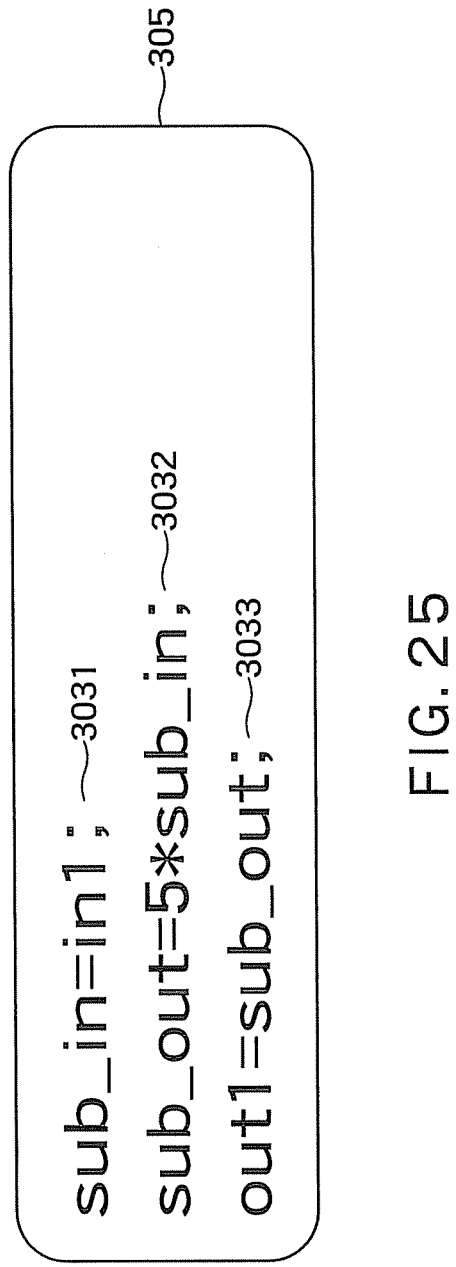
FIG. 25 shows an example of program 305.
Figures 26, 27:
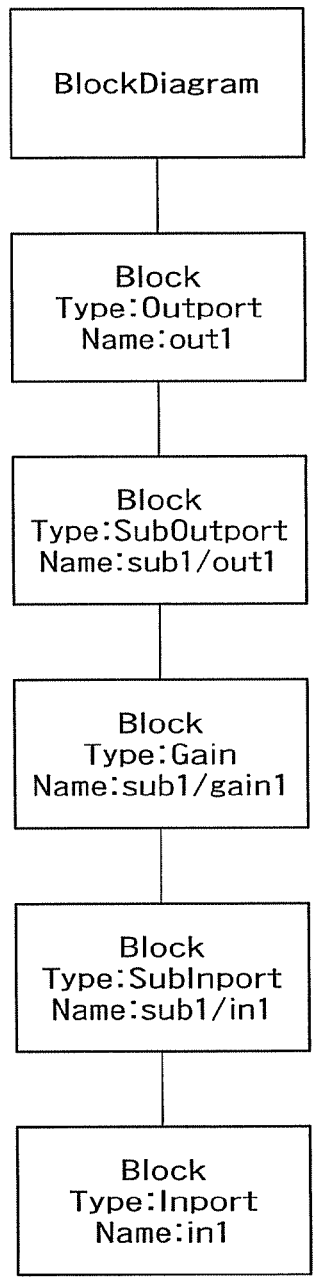
FIG. 26 shows execution sequence information 225.
FIG. 27 shows an example of program 306.

The processing by the execution sequence generation processor 21 and program generation processor 23 shown in Embodiment 1 and Embodiment 2 is performed on the data structure 107. There are a plurality of ways of handling the subsystem input block and the subsystem output block in that case. FIG. 24 and FIG. 25 show examples of execution sequence information 224 and program 305 when the subsystem input block and subsystem output block are explicitly indicated in the program, and FIG. 26 and FIG. 27 show execution sequence information 225 and example of program 306 when information of the input/output blocks of the subsystem is not explicitly indicated in the program.

Here, a calculation block element 2257 is a multiplication by a constant. Therefore, when a program is generated from the execution sequence information, in the processing 2302 of the flowchart in FIG. 9, two elements for one block are pushed in a stack in order of an opcode "*" and constant (=5) of an operand for the calculation block element 2257.

In the processing of generating the execution sequence information 224, the subsystem input block and subsystem output block are handled in the same way as the storage block according to Embodiment 2, divided into the input side and output side and regarded as different block diagram pieces (2256a and 2256b, and 2258a and 2258b).

That is, the subsystem input block is expressed as a first input subblock element (or first subsystem input block) and a second input subblock element (or second subsystem output block) on the input side and divided between these elements. Furthermore, the subsystem output block is expressed as a first output subblock element (or first subsystem output block) and second output subblock element (or second subsystem output block) on the input side and divided between these elements. In this way, a plurality of block diagram pieces are generated. When the execution sequence of program instructions is determined, the execution sequence is determined in such a way that program instructions corresponding to the block diagram piece including the first input subblock element are executed before program instructions corresponding to the block diagram piece including the second input subblock element, and program instructions corresponding to the block diagram piece including the first output subblock element are executed before program instructions corresponding to the block diagram piece including the second output subblock element. If there is a branch point, the execution sequence is determined by also adding the restrictions explained in Embodiment 1 (program instructions corresponding to the block diagram piece located closer to the input side than the branch point are executed before program instructions corresponding to the block diagram piece closer to the output side than the branch point).

The program generation processor 23 handles the subsystem input block and subsystem output block in the same way as branch points and thereby saves the subsystem input block and subsystem output block as variables (sub_in, sub_out) in the program 305.

When the information on the input/output blocks of the subsystem is not explicitly indicated in the program, the information on the subsystem input block and subsystem output block is also saved in the execution sequence information 225, but since a statement of the program is not divided at the parts of the subsystem input block and subsystem output block, and therefore the block diagram piece is not divided either. In this case, the execution sequence generation processor 21 handles the subsystem input block and subsystem output block in the same way as a general calculation block and the program generation processor 23 adopts a method of not generating the program for the subsystem input block and subsystem output block (subsystem input block and subsystem output block are not stored in the stack through the processing 2302 in the flowchart of FIG. 9).

Both the execution sequence information 224 and execution sequence information 225 save information on the subsystem input block and subsystem output block. Therefore, when handling the execution sequence information 224 using the processing in the flowchart of FIG. 13, it is possible to reconstruct the single-layered block diagram 107 shown in FIG. 23 by handling the subsystem input block and subsystem output block in the same way as the storage block and handling, when handling the execution sequence information 225, the subsystem input block and subsystem output block in the same way as a general calculation block.

Figure 28:
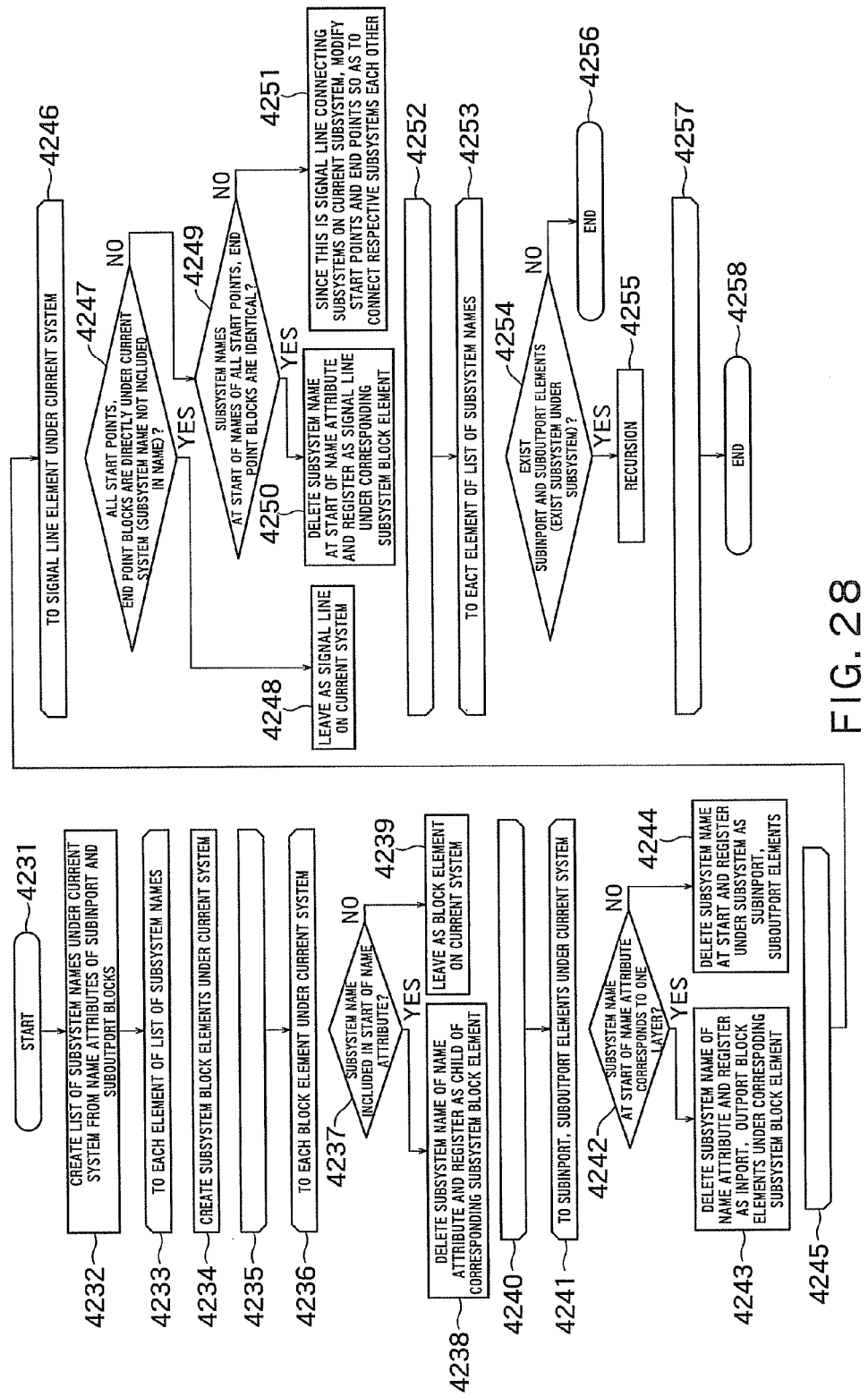
FIG. 28 shows a flow of reconstruction from the single-layered data structure 107 to the layered data structure 106.

The reconstruction from the single-layered data structure 107 in FIG. 23 to the layered data structure 106 in FIG. 22 will be explained with reference to the flowchart in FIG. 28. In the data structure 107 in FIG. 23, the subsystem input block and subsystem output block are 1256 and 1258, since both have subsystem names of sub1 added to the start of the name attribute, sub1 is the only element of the subsystem name list created through processing 4232. Therefore, 1152 is the only subsystem block generated under the root 1150 in the data structure 106 of FIG. 22 through processing 4234.

The block elements (except the subsystem input block and subsystem output block) existing in the data structure 107 in FIG. 23 are 1151, 1257 and 1153. Since 1151 and 1153 do not include subsystem names in the name attribute, 1151 and 1153 are registered as they are under a root 1150 through processing 4239. Since 1257 includes "sub1/" at the start of the name, "sub1/" is deleted through processing 4238 and registered as 1157 under 1152.

The subsystem input block and subsystem output block existing in the data structure 107 in FIG. 23 are 1256 and 1258 and since both have the subsystem names "sub1" corresponding to only one layer at the start of the names, 1256 and 1258 are registered as 1156 and 1158 under 1152 through processing 4243.

The signal line elements existing in the data structure 107 in FIG. 23 are 1154, 1155, 1259 and 1260. Of these elements, 1259 and 1260 are signal lines whose start point blocks and end point blocks are all under the same subsystem, and therefore the subsystem names are deleted through processing 4250 and 1259 and 1260 are registered as 1159 and 1160 under 1152. As for 1154 and 1155, any one of the start point block and end point block is a block under subsystem "sub1"

(subsystem input block and subsystem output block) and the remaining one is a block under the current block. Therefore, these are registered by changing the one indicating a block under the subsystem to a subsystem name through processing 4251 as 1154 and 1155 under 1150.

The block diagrams indicated by the data structures 106 and 107 in FIG. 22 and FIG. 23 are examples including only subsystems corresponding to one layer, and therefore judgment 4254 results in "No" and the processing ends through 4256, but even when the subsystem is nested in a plurality of layers, such a case can be handled through a distinction between processing of the subsystem input block and that of the subsystem output block through judgment 4242 and recursion through processing 4255.

In this way, the data structure 106 of the layered block diagram can be generated (reconstructed) from the execution sequence information 224 in FIG. 24 or the execution sequence information 225 in FIG. 26.

The present embodiment has explained interconversion between a layered block diagram and program.

The present embodiment has explained the subsystem which has neither branch point nor storage block, but the method explained in the present embodiment is also applicable to a block diagram of a subsystem having the branch point or storage block indicated by 101 in FIG. 2 or 103 in FIG. 15.

This is because in the processing of generating a single layer block diagram from a layered block diagram and the processing of reconstructing a layered block diagram from a single-layered block diagram, a storage block inside a subsystem can be handled as a block element and a signal line having a branch point inside a subsystem can be handled as a signal line having no branch point, the method of generating a program from a single layer block diagram and a method of combining a single layer block diagram from a program are similar to the methods explained in Embodiment 1 and Embodiment 2 and the present embodiment is therefore also applicable to block diagrams including branch points and storage blocks.

Furthermore, the highest system of the present embodiment (FIG. 21) has only an input block, subsystem block and output block, but since the method of generating a program from a single layer block diagram and the method of combining a single layer block diagram from a program are the same as the methods explained in Embodiments 1 and 2, the methods explained in the present embodiment are also applicable to a block diagram in which the highest system includes branch points and calculation blocks.

What is claimed is:

1. A program generating apparatus including a processor and a memory, comprising:
   a block diagram storing unit configured to store a block diagram including an input block element, a calculation block element, an output block element, data lines indicating data flows between the input block element, the calculation block element, and the output block element, and a branch point that branches at least one of the data lines;
   a block diagram dividing unit configured to divide the block diagram into an input side piece and one or more output side pieces at the branch point and connect a branch point block element to one end of each of data lines which have been connected to the branch point in the input side piece and the one or more output side pieces to generate a plurality of block diagram pieces, wherein each of the plurality of block diagram pieces includes the input side piece or one of the one or more output side pieces;
   a program instruction generator configured to generate a plurality of program instructions, respectively corresponding to the plurality of block diagram pieces, to perform processing on the plurality of block diagram pieces;
   an execution sequence determining unit configured to determine an execution sequence of the plurality of program instructions so that a first program instruction of a first block diagram piece including the input side piece is executed before one or more second program instructions of one or more second block diagram pieces including the one or more output side pieces;
   a structural information generator configured to generate structural information for each of the plurality of block diagram pieces; and
   a program generator configured to arrange the plurality of program instructions according to the execution sequence and generate a program including each of the plurality of program instructions as arranged, wherein the program generator sets comment lines respectively corresponding to the plurality of program instructions, and writes the structural information of each of the plurality of block diagram pieces into the comment lines corresponding thereto, respectively;
   wherein the structural information generator generates the structural information of each of the plurality of block diagram pieces so that a block element at an end of each of the plurality of block diagram pieces is assigned to a child node of a root node of a tree structure, the block element being one of the input block element, the calculation block element, the output block element, or the branch point block element, and
   a first block element to be processed before a second block element assigned to a parent node different from the root node is assigned to a child node of the parent node, the first block element and the second block element each being one of the input block element, the calculation block element, the output block element, or the branch point block element.

2. The apparatus according to claim 1, wherein at least one calculation block element is a storage calculation block element which
   (1) generates calculation data by performing a calculation using at least a latter of data received from a source block element of the storage calculation block element and storage data based on previously received data from the source block element and updates the storage data using at least the previously received data received from the source block element, and
   (2) sends out the calculation data to a destination block element of the storage calculation block element,
      wherein one of the plurality of block diagram pieces includes the storage calculation block element, and
      the block diagram dividing unit divides the storage calculation block element into a first calculation block element that performs processing in (1) and a second calculation block element that performs processing in (2), and divides the one of the plurality of block diagram pieces into two block diagram pieces between the first calculation block element and the second calculation block element.

3. A program generating apparatus including a processor and a memory, comprising:

a multilayer block diagram storing unit configured to store a multilayered block diagram including:
  at least an input block element and an output block element out of the input block element, a calculation block element, and the output block element;
  a subsystem block;
  first data lines indicating data flows between at least the input block element, the output block element, and the subsystem block out of the input block element, the calculation block element, the output block element, and the subsystem block; and
  a subblock diagram of the subsystem block, which includes an input subblock element, a calculation subblock element, an output subblock element and second data lines indicating data flows between the input subblock element, the calculation subblock element, and the output subblock element;
a single layer block diagram generator configured to substitute the subblock diagram for the subsystem block in the multilayered block diagram, connect a third data line connected to an input of the subsystem block to an input of the input subblock element, connect a fourth data line connected to an output of the subsystem block to an output of the output subblock element and thereby generate a single layer block diagram;
a structural information generator configured to generate structural information of the single layer block diagram;
a program instruction generator configured to generate program instructions for performing processing on the single layer block diagram;
a program generator configured to generate a program including the program instructions, wherein the program generator sets a comment line corresponding to the program instructions in the program, and writes the structural information of the single layer block diagram into the comment line in the program;
a block diagram dividing unit configured to:
  divide the input subblock element in the single layer block diagram into a first input subblock element that receives first data from a source element of the input subblock element and a second input subblock element that sends the first data received by the first input subblock element to a destination element of the input subblock element,
  divide the output subblock element in the single layer block diagram into a first output subblock element that receives second data from a source element of the output subblock element and a second output subblock element that outputs the second data received by the first output subblock element to a destination element of the output subblock element, and
  generate a plurality of block diagram pieces by dividing the single layer block diagram between the first input subblock element and the second input subblock element and between the first output subblock element and the second output subblock element;
wherein
the structural information generator generates structural information of each of the plurality of block diagram pieces so that a block element at an end of each of the plurality of block diagram pieces is assigned to a child node of a root node of a tree structure, the block element being one of the input block element, the output block element, the calculation block element, the first input subblock element, the second input subblock element, the first output subblock element, the second output subblock element, and the calculation subblock element, and a first block element to be processed before a second block element assigned to a parent node different from the root node is assigned to a child node of the parent node, the first block element and the second block element each being one of the input block element, the output block element, the calculation block element, the first input subblock element, the second input subblock element, the first output subblock element, the second output subblock element, and the calculation subblock element,
the program instruction generator generates a plurality of program instructions to perform processing on the plurality of block diagram pieces, respectively,
the apparatus further comprises an execution sequence determining unit configured to determine an execution sequence of the plurality of program instructions so that a first program instruction corresponding to a first block diagram piece including the first input subblock element is executed before a second program instruction corresponding to a second block diagram piece including the second input subblock element and a third program instruction corresponding to a third block diagram piece including the first output subblock element is executed before a fourth program instruction corresponding to a fourth block diagram piece including the second output subblock element, and
the program generator arranges the plurality of program instructions according to the execution sequence and generates a program including the plurality of program instructions as arranged, wherein the program generator sets a plurality of comment lines respectively corresponding to the plurality of program instructions, and writes structural information of each of the plurality of block diagram pieces into the plurality of comment lines corresponding thereto, respectively.

4. A block diagram generating apparatus including a processor and a memory, comprising:
  a data reading unit configured to read data of a tree structure from a comment line of a program, the tree structure including an input block element, a calculation block element, an output block element, and branch point block elements that respectively indicate a branch of a data line, wherein each of the input block element, the calculation block element, the output block element, and the branch point block elements has a block identifier and is assigned to a node different from a root node in the tree structure; and
  a block diagram piece generator configured to generate a plurality of block diagram pieces by sequentially connecting a data line from a first block element assigned to a child node to a second block element assigned to a parent node of the child node starting from each child node of the root node toward each leaf node in the tree structure, the first block element and the second block element each being one of the input block element, the calculation block element, the output block element, and the branch point block elements, wherein the program includes a plurality of program instructions to perform processing, respectively, on the plurality of block diagram pieces, and the program includes structure information of each of the plurality of block diagram pieces in comment lines respectively corresponding to the plurality of program instructions as the data of the tree structure; and
  a combination unit configured to generate a block diagram, to which the plurality of block diagram pieces are combined, by integrating branch point block elements having identical block identifiers among different block diagram pieces into a branch point.

5. The apparatus according to claim 4, wherein the tree structure assigns a first calculation block element and a second calculation block to nodes different from the root node, respectively, wherein:
the first calculation block element receives first data, generates calculation data by performing a calculation using at least a latter of the first data and storage data based on previously received data and generates and stores storage data using the first data,
the second calculation block element sends out the calculation data generated by the first calculation block element, and
the combination unit integrates the first calculation block element and the second calculation block element having identical identifiers among different block diagram pieces into a storage calculation block element.

6. A block diagram generating apparatus including a processor and a memory, comprising:
a tree structure reading unit configured to read, from a comment line of a program, data of a tree structure in which block elements are assigned to nodes different from a root node, the block elements including:
at least an input block element and an output block element out of the input block element, the output block element, and a calculation block element,
a calculation subblock element,
a first input subblock element that receives first data from a source element of the first input subblock element,
a second input subblock element that sends out the first data received by the first input subblock element,
a first output subblock element that receives second data from a source element of the first output subblock element and
a second output block element that outputs the second data received by the first output subblock element;
a block diagram piece generator configured to generate a plurality of block diagram pieces by sequentially connecting a first element assigned to a child node to a second element assigned to a parent node of the child node with a data line, starting from each leaf node in the tree structure toward each child node of the root node, the first element and the second element each being one of the input block element, the output block element, the calculation block element, the calculation subblock element, the first input subblock element, the second input subblock element, the first output subblock element, and the second output block element;
a single layer block diagram generator configured to generate a single layer block diagram into which the plurality of block diagram pieces are combined by integrating the first input subblock element and the second input subblock element between different block diagram pieces into a single input subblock element and integrating the first output subblock element and the second output subblock element between different block diagram pieces into a single output subblock element, wherein the program includes a plurality of program instructions to perform processing, respectively, on the plurality of block diagram pieces, and the program includes structure information of each of the plurality of block diagram pieces in respective comment lines corresponding to the plurality of block diagram pieces as the data of the tree structure; and
a multilayered block diagram generator configured to:
specify a subblock diagram in the single layer block diagram, the subblock diagram being formed by the single input subblock element, the calculation subblock element, the output subblock element, and data lines connecting between the single input subblock element, the calculation subblock element, and the output subblock element,
substitute a subsystem block for the subblock diagram, connect a data line which has been connected to an input of the single input subblock element to an input of the subsystem block, connect a data line which has been connected to an output of the single output subblock element to an output of the subsystem block and thereby generate a block diagram, and
generate and output a multilayered block diagram including both of the subblock diagram and the block diagram.

* * * * *